US011600022B2

(12) United States Patent
Momcilovic et al.

(10) Patent No.: US 11,600,022 B2
(45) Date of Patent: Mar. 7, 2023

(54) MOTION CAPTURE CALIBRATION USING DRONES

(71) Applicant: Weta Digital Limited, Wllington (NZ)

(72) Inventors: Dejan Momcilovic, Wellington (NZ); Jake Botting, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/120,024

(22) Filed: Dec. 11, 2020

(65) Prior Publication Data

US 2022/0067969 A1    Mar. 3, 2022

Related U.S. Application Data

(60) Provisional application No. 63/072,085, filed on Aug. 28, 2020.

(51) Int. Cl.
*G06T 7/80* (2017.01)
*G05D 1/00* (2006.01)

(52) U.S. Cl.
CPC .............. *G06T 7/80* (2017.01); *G05D 1/0094* (2013.01); *G06T 2207/10021* (2013.01)

(58) Field of Classification Search
CPC ............ G06T 7/80; G06T 2207/10021; G05D 1/0094
See application file for complete search history.

(56) References Cited

U.S. PATENT DOCUMENTS

| 4,687,325 A | * | 8/1987 | Corby, Jr. ............... G01B 11/25 |
|   |   |   | 356/3.09 |
| 2002/0140821 A1 | * | 10/2002 | Segev .................. H04N 5/2354 |
|   |   |   | 348/E5.038 |

(Continued)

FOREIGN PATENT DOCUMENTS

| EP | 3012781 | * 10/2015 |
| EP | 3355277 A1 | 1/2018 |

(Continued)

OTHER PUBLICATIONS

International Search Report for International Patent Application No. PCT/NZ2021/050043 filed Mar. 17, 2021; dated Jul. 5, 2021; 4 pages.

(Continued)

*Primary Examiner* — Zaihan Jiang
(74) *Attorney, Agent, or Firm* — Trellis IP Law Group, PC

(57) ABSTRACT

Embodiments facilitate the calibration of cameras in a live action scene using drones. In some embodiments, a method configures a plurality of reference cameras to observe at least one portion of the live action scene. The method further configures one or more moving cameras having unconstrained motion to observe one or more moving objects in the live action scene and to observe at least three known reference points associated with the plurality of reference cameras. The method further receives reference point data in association with the one or more moving cameras, where the reference point data is based on the at least three known reference points. The method further computes a location and an orientation of each moving camera of the one or more moving cameras based on one or more of the reference point data and one or more locations of one or more reference cameras of the plurality of reference cameras.

20 Claims, 13 Drawing Sheets

(56) References Cited

U.S. PATENT DOCUMENTS

| | | | | |
|---|---|---|---|---|
| 2004/0178955 | A1* | 9/2004 | Menache | G01S 5/14 |
| | | | | 342/465 |
| 2005/0125119 | A1* | 6/2005 | Srack | G01B 5/0025 |
| | | | | 702/152 |
| 2005/0131586 | A1* | 6/2005 | Srack | G01B 5/0025 |
| | | | | 701/1 |
| 2005/0253870 | A1 | 11/2005 | Kotake | |
| 2009/0066968 | A1* | 3/2009 | Ikeda | G01B 11/245 |
| | | | | 356/602 |
| 2010/0045701 | A1 | 2/2010 | Scott | |
| 2011/0025853 | A1* | 2/2011 | Richardson | H04N 5/247 |
| | | | | 348/E7.085 |
| 2013/0010081 | A1 | 1/2013 | Tenney | |
| 2013/0063558 | A1 | 3/2013 | Phipps | |
| 2013/0211774 | A1 | 8/2013 | Bentley | |
| 2015/0149000 | A1 | 5/2015 | Rischmuller | |
| 2015/0341548 | A1* | 11/2015 | Petrescu | H04N 5/23219 |
| | | | | 348/207.1 |
| 2017/0004358 | A1 | 1/2017 | Bose | |
| 2017/0251538 | A1* | 8/2017 | Green | G06T 7/74 |
| 2017/0264936 | A1* | 9/2017 | Depies | G02B 27/0093 |
| 2017/0264945 | A1* | 9/2017 | Depies | H04N 21/8133 |
| 2018/0046187 | A1 | 2/2018 | Martirosyan | |
| 2018/0232194 | A1 | 8/2018 | Chen | |
| 2018/0272535 | A1 | 9/2018 | Ogawa | |
| 2019/0050000 | A1 | 2/2019 | Kennedy | |
| 2019/0050616 | A1* | 2/2019 | Noth | G06V 20/00 |
| 2019/0066335 | A1 | 2/2019 | Dahlstrom | |
| 2019/0098212 | A1 | 3/2019 | Shain | |
| 2019/0220039 | A1 | 7/2019 | Wu | |
| 2019/0313085 | A1 | 10/2019 | Trevor | |
| 2019/0391254 | A1* | 12/2019 | Asghar | G01S 13/723 |
| 2020/0145644 | A1 | 5/2020 | Cordes | |
| 2020/0184700 | A1 | 6/2020 | Cotter | |
| 2020/0207474 | A1 | 7/2020 | Foggia | |
| 2021/0027496 | A1* | 1/2021 | Koyama | H04N 13/246 |

FOREIGN PATENT DOCUMENTS

| | | |
|---|---|---|
| WO | 2012088076 A1 | 6/2013 |
| WO | 2014020108 A1 | 2/2014 |

OTHER PUBLICATIONS

International Search Report for International Patent Application No. PCT/NZ2021/050044 filed Mar. 17, 2021; dated Jul. 5, 2021; 4 pages.

International Search Report for International Patent Application No. PCT/NZ2021/050045 filed Mar. 17, 2021; dated Jul. 5, 2021; 7 pages.

* cited by examiner

MOTION CAPTURE CALIBRATION USING DRONES

CROSS-REFERENCE TO RELATED APPLICATIONS

This application claims priority from U.S. Provisional Patent Application No. 63/072,085, entitled "MOTION CAPTURE CALIBRATION USING DRONES WITH MULTIPLE CAMERAS," filed Aug. 28, 2020 (WD0066PP1); U.S. Provisional Patent Application No. 63/072,088, entitled "MOTION CAPTURE CALIBRATION USING DRONES," filed Aug. 28, 2020 (WD0066PP2); and U.S. Provisional Patent Application No. 63/072,092, entitled "MOTION CAPTURE CALIBRATION USING FIXED CAMERAS AND DRONES," filed Aug. 28, 2020 (WD0066PP3) which are hereby incorporated by reference as if set forth in full in this application for all purposes. This application is related to U.S. Utility patent application Ser. No. 17/120,020, (WD0066US1), entitled "MOTION CAPTURE CALIBRATION USING DRONES WITH MULTIPLE CAMERAS," filed Dec. 11, 2020 and U.S. Utility patent application Ser. No. 17/120,031, (WD0066US3), entitled "MOTION CAPTURE CALIBRATION USING CAMERAS AND DRONES," filed Dec. 11, 2020 which are hereby incorporated by reference as if set forth in full in this application for all purposes.

BACKGROUND

Many visual productions (e.g., movies, videos, clips, and recorded visual media) include combinations of real and digital images to create animation and special effects that form an illusion of being integrated with live action. For example, a visual production may include a live actor in a location shoot appearing in a scene with a computer-generated ("CG," "virtual," or "digital") character. It is desirable to produce seemingly realistic visual productions by compositing CG items with the live action items. Often, several types of cameras are used on a set, where each camera provides different data, such as images of the live action scene, depth information, tracking of markers in a live action scene, etc. It is necessary to calibrate the various camera data in real time to accurately composite the live action elements with CG images and produce a realistic looking visual production.

SUMMARY

Embodiments generally relate to the calibration of cameras in a live action scene using drones. Embodiments provide for automated calibration of cameras in a live action scene using drones and reference points in images captured by the cameras associated with the drones. In various embodiments, a method configures a plurality of reference cameras to observe at least one portion of the live action scene. The method further configures one or more moving cameras having unconstrained motion to observe one or more moving objects in the live action scene and to observe at least three known reference points associated with the plurality of reference cameras. The method further receives reference point data in association with the one or more moving cameras, where the reference point data is based on the at least three known reference points. The method further computes a location and an orientation of each moving camera of the one or more moving cameras based on one or more of the reference point data and one or more locations of one or more reference cameras of the plurality of reference cameras.

DETAILED DESCRIPTION OF EMBODIMENTS

Figure 1:
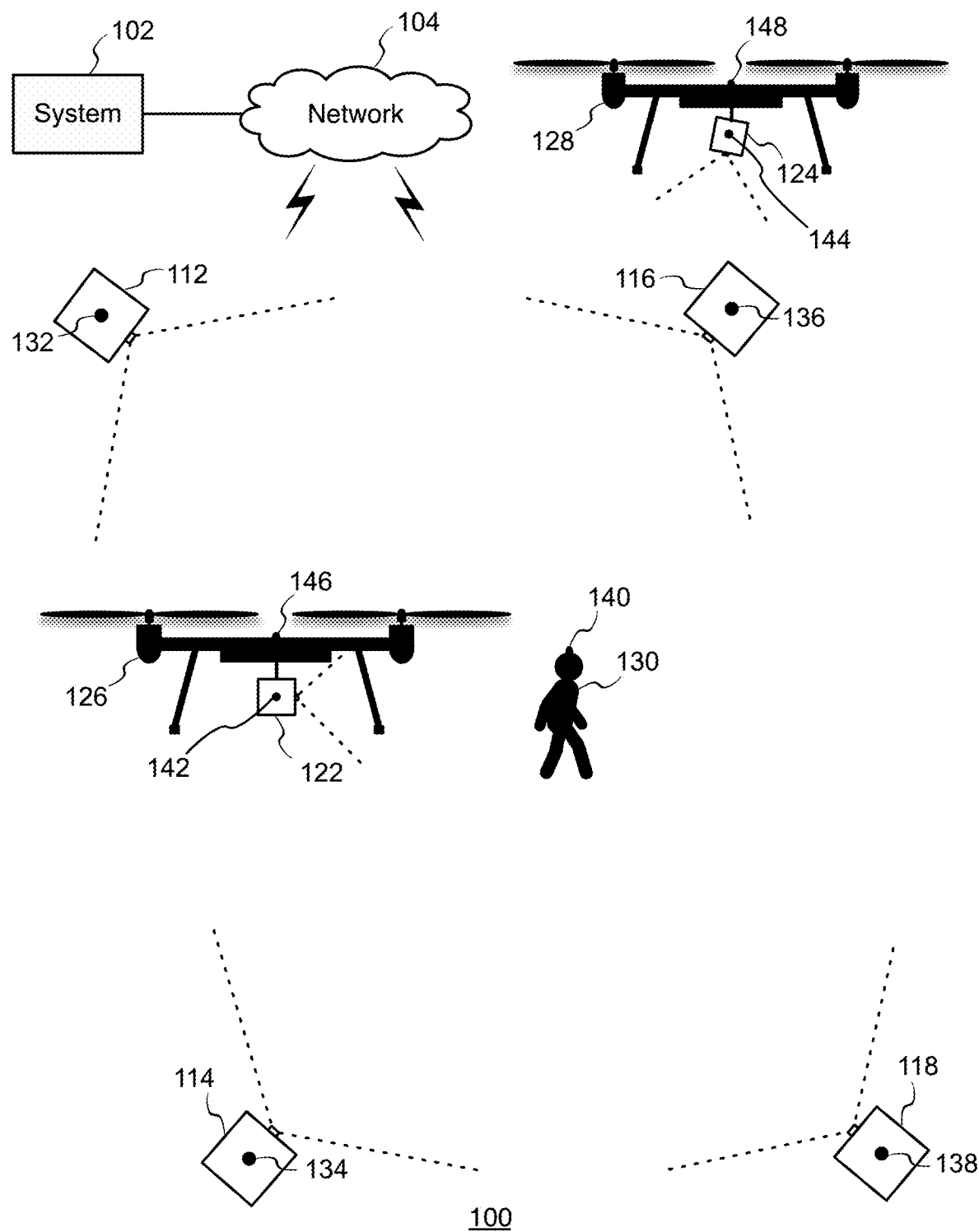
FIG. 1 is a top-view block diagram of an example environment for calibrating cameras in a live action scene, which may be used for embodiments described herein.

Embodiments facilitate the calibration of cameras in a live action scene using drones. In some embodiments, an automated system calibrates cameras in a live action scene using reference points in images captured by cameras associated with the drones. This calibration may be referred to as motion capture (MoCap) calibration. Embodiments described herein enable the system to provide a calibrated multiview vision system for tracking reference points, which include drones and may include active and/or passive reference markers.

In various embodiments, an apparatus such as a drone includes at least two cameras, where one camera is configured to follow the action in the live action scene, which includes following the actors. The other camera is configured to view reference markers in the live action scene. As described in more detail herein, in various embodiments, a system configures multiple reference cameras to observe at least one portion of the live action scene. The system further configures at least a first camera coupled to a drone to observe one or more moving objects in the live action scene. The system further configures at least a second camera coupled to the drone to observe at least three known reference points located in the live action scene. The system further receives reference point data in association with at least the second camera, where the reference point data is based on the three known reference points. The system further computes a location and an orientation of the first camera and the second camera based on the reference point data.

In various embodiments, a system uses reference point data in association with moving cameras on drones and locations of one or more reference cameras in order to compute the locations of the moving cameras on the drones. As described in more detail herein, in various embodiments, a system configures multiple reference cameras to observe at least one portion of the live action scene. The system further configures one or more moving cameras having unconstrained motion to observe one or more moving objects in the live action scene and to observe at least three known reference points associated with the reference cameras. The system further receives reference point data in association with the one or more moving cameras, where the reference point data is based on at least the three known reference points. The system further computes a location and an orientation of each moving camera of the one or more moving cameras based on one or more of the reference point data and one or more locations of one or more reference cameras.

In various embodiments, a system uses reference point data in association with at least three known reference points and the one or more reference points associated with the one or more moving cameras in order to compute the locations of the moving cameras on the drones. As described in more detail herein, in various embodiments, a system configures multiple reference cameras to observe at least three known reference points located in the live action scene and to observe one or more reference points associated with one or more moving cameras having unconstrained motion. The system further configures the one or more moving cameras to observe one or more moving objects in the live action scene. The system further receives reference point data in association with one or more reference cameras, where the reference point data is based on at least the three known reference points and the one or more reference points associated with the one or more moving cameras. The system further computes a location and an orientation of each moving camera based on one or more of the reference point data and one or more locations of one or more reference cameras.

FIG. 1 is a top-view block diagram of an example environment 100 for calibrating cameras in a live action scene, which may be used for embodiments described herein. Shown are a system 102, a network 104, and cameras 112, 114, 116, and 118. In various embodiments, cameras 112, 114, 116, and 118 capture video or images of objects such as person 130 in their fields of view (indicated by dotted lines) of environment 100.

In various embodiments, cameras 112, 114, 116, and 118 are in known locations and/or positions. In various embodiments, the location and/or position of the given camera is ascertained and/or predetermined. In various embodiments, cameras 112, 114, 116, and 118 may also be referred to as reference cameras 112, 114, 116, and 118.

As described in more detail herein, in various embodiments, one or more reference points are attached to at least some of the cameras in environment 100. For example, reference points 132, 134, 136, and 138 are attached to respective reference cameras 112, 114, 116, and 118. Reference points 132-138 enable reference cameras 112-118 to identify and locate each other via their respective attached reference points 132-138. In various embodiments, as the positions and/or locations of reference cameras 112-118 are ascertained and/or predetermined, reference points 132-138 being attached to respective reference cameras 112-118 may also be referred to as known or predetermined reference points.

In various embodiments, mobile cameras 122 and 124 may also identify and locate cameras 112-118 via attached reference points 132-138 when in the respective fields of view of cameras 122 and 124. In various embodiments, as the system ascertains the positions and/or locations of one or more given mobile cameras (e.g., mobile cameras 122, 124, etc.), such mobile cameras may also be referred to as reference cameras. Also, any reference points attached to such reference cameras may be also referred to as known or predetermined reference points. In other words, there may be reference points on mobile cameras. This enables a given mobile camera to determine its location and/or position based on known reference points or a series or chain of known reference points attached to stationary reference cameras, a moving system of reference cameras (e.g., cameras on a vehicle, on a train car on a track, etc.), and/or independently moving cameras (e.g., mobile cameras 122, 124, etc.).

In various embodiments, the system computes the location of each moving camera based at least in part on one or more of global positioning system (GPS) data, position sensor data, and inertial guide sensor data, or any combination thereof. The system may use these techniques to increase the precision of computing locations and positions of cameras in combination with other embodiments described herein. In various embodiments, each camera in environment 100 may also use GPS techniques to supplement the system in determining the location and/or position of each camera. In some embodiments, the system computes the location of one or more mobile or moving cameras on a mobile apparatus such as a drone based at least in part on one or more global positing system (GPS) techniques. In various embodiments, a known location and position/orientation of a given object may be based on a predefined global coordinate system, and known relative to the given object's location and position relative to another object. In various embodiments, each camera in environment 100 may also use a combination of positioning data from position sensors or encoders (e.g., motion encoders, rotation encoders, etc.) to supplement the system in determining the location and/or position of each camera. In another example, in various embodiments, each camera in environment 100 may also use a combination of inertial guide sensors (e.g., altimeters, proximity sensors, acceleration, etc.) to supplement the system in determining the location and/or position of each camera.

As indicated above, in various embodiments, the reference cameras may be mounted on one or more rigid structures. For example, in some embodiments, cameras 112-118 may each be attached to tripods standing on the ground (shown in FIG. 2). In some embodiments, cameras 112-118 may each be attached to tripods standing on one or more stationary platforms or levels. Such platforms or levels may be different from each other, yet stationary relative to the ground.

In various embodiments, cameras 112-118 may be fixed relative to each other. For example, in some embodiments, cameras 112-118 may all be attached to the same single rigid frame such as a cross-braced frame, truss, etc. As such cameras 112-118 remain fixed relative to each other. If the single rigid frame is on the ground or on a stationary platform, the group of reference cameras may remain stationary.

In various embodiments, if the single rigid frame is moving (e.g., not on the ground or on a stationary platform), the reference cameras 112-118 may be attached to the rigid frame move together. For example, in some scenarios, cameras 112-118 may be on a frame that is floating on water (e.g., ocean, lake), where the locations and/or positions of cameras 112-118 remain known relative to each other even if the frame has movement from floating on the water. In some scenarios, cameras 112-118 may be on a frame that is being carried in the air (e.g., by a drone, group of drones, etc.). Similarly, the locations and/or positions of cameras 112-118 remain known relative to each other even if the frame has movement from hovering in the air. As such, the reference points attached to cameras 112-118 are known reference points.

Also shown are cameras 122 and 124. In various embodiments, cameras 122 and 124 are mobile. As such, cameras 122 and 124 may also be referred to as mobile cameras or moving cameras. As such, the terms mobile cameras and moving cameras may be used interchangeably. In various embodiments, cameras 122 and 124 may be attached to respective drones 126 and 128. In various embodiments, cameras 122 and 124 may be mounted to remote controlled heads and/or gimbaled to facilitate in following the action of a scene. For example, cameras 122 and 124 may zoom, pan, tilt, etc. to follow a hero actor in environment 100.

As indicated above, in various embodiments, one or more reference points are attached to at least some of the cameras in environment 100. For example, reference points 132, 134, 136, and 138 are attached to respective reference cameras 112, 114, 116, and 118. Reference points 132-138 enable reference cameras 112-118 to identify and locate each other via their respective attached reference points 132-138. Mobile cameras 122 and 124 may also identify and locate cameras 112-118 via attached reference points 132-138 when in the respective fields of view of cameras 122 and 124.

For the purposes of computing the location of a given camera such as camera 112, system 102 may render the location of the given camera the same as the location reference point such as reference point 132 that is attached to camera 112. This common location may apply to any camera-reference point pairing or association.

As described in more detail below, system 102 receives videos including images from multiple cameras such as cameras 112-118. In various embodiments, system 102 utilizes cameras 112-118 to capture images of known reference points in the live action scene or set for image. Cameras 112-118 provide reference point data for system 102 to compute the locations of cameras 112-118. In various example embodiments, reference points may be also referred to as reference markers. Embodiments described herein calibrate cameras 112-118, which improve the accuracy of system 102 locating and tracking reference points.

In various embodiments, reference point 140 is attached to person 130. Reference point 140 enables any of reference cameras 112-118 and mobile cameras 122 and 124 to identify and locate person 130 via attached reference point 140 when in the respective fields of view of cameras 112-124. As described in more detail herein, in various embodiments, some references points such as reference point 140 may be continuously in the fields of view of cameras 122 and 124, which are configured to follow one or more reference points in the scene action, which may involve person 130.

In various embodiments, reference points 142 and 144 are attached to respective mobile cameras 122 and 124. Also, reference points 146 and 148 are attached to respective drones 126 and 128. Reference points 122 and 124 enable mobile cameras 122 and 124 to identify and locate each other based on their respective attached reference points 142 and 144 when in the respective fields of view of cameras 122 and 124.

Similarly, reference point 146 enables mobile camera 124 to identify and locate drone 126 based on reference point 146 when in the respective field of view of camera 124. Also, reference point 148 enables mobile camera 122 to identify and locate drone 128 based on reference point 148 when in the respective field of view of camera 122.

In various embodiments, cameras 112-124 may be hidden or camouflaged such that these and other cameras do not capture images that visibly show these cameras. As such, system 102 locates and calibrates these cameras based on the reference points attached to them.

As indicated herein, in various embodiments, cameras 112-118 may be stationary or fixed, depending on the particular implementation. Cameras 112-118 are also orientated in different directions and have broad overlapping fields of view to capture video or images of much of environment 100. Cameras 112-118 capture various reference points in their fields of view, such as those reference points described in connection with FIG. 1. The particular distance between cameras 112-118 and their overall coverage of the set may vary, and will depend on the particular implementation.

Figure 2:
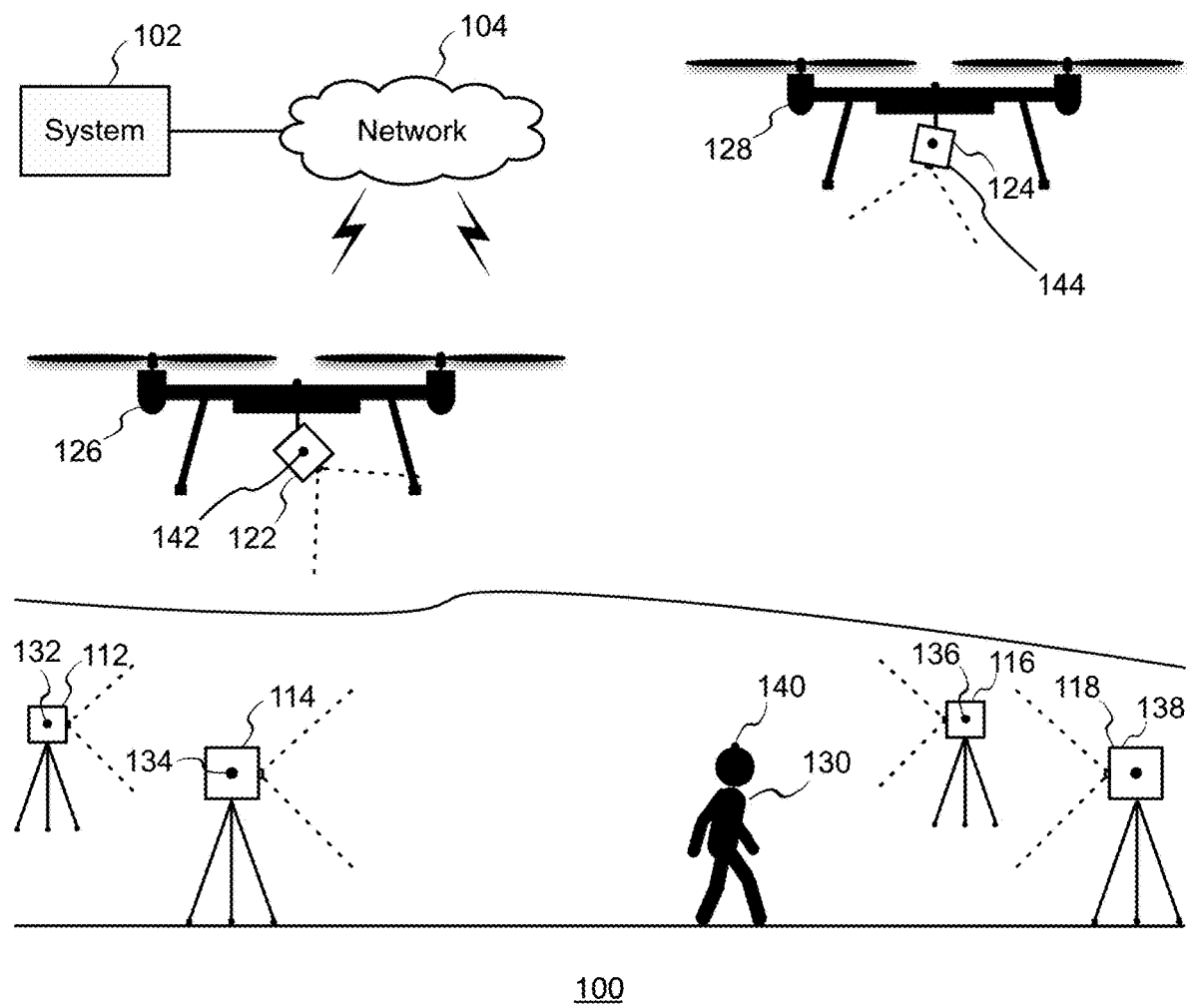
FIG. 2 is a side-view block diagram of an example environment for calibrating cameras in a live action scene, which may be used for embodiments described herein.

FIG. 2 is a side-view block diagram of example environment 100 of FIG. 1 for calibrating cameras in a live action scene, which may be used for embodiments described herein. In various embodiments, environment 100 may have multiple levels or layers of cameras for capturing different aspects of environment 100. For example, in various embodiments, reference cameras 112-118 may operate on a first level or layer. In this context, two or more cameras operating at the same level or layer may mean operating at the same height (e.g., 4 feet above ground, 5 feet above ground, etc.) or operating in the same height range (e.g., between 1 foot above ground to 8 feet above ground, etc.). In various embodiments, the positions and/or locations of reference cameras 112-118 are known relative to each other whether the reference cameras remain stationary or move together as a unit. The particular levels, layers, and/or ranges may vary, depending on the particular implementation.

In various embodiments, mobile cameras 122 and 124 being mobile may each operate in their own separate levels or layers and/or share levels or layers throughout environment 700, depending on the particular scene and action in the scene that either cameras 122 and 124 are capturing. For example, in various embodiments, mobile cameras 122 and 124 may operate at the same substantial layer or level with each other, and either may independently move to another layer or level. In various embodiments, any one or more of mobile cameras 122 and 124 may operate at the same substantial layer or level as other cameras such as cameras 112-118.

Referring to both FIGS. 1 and 2, in various embodiments, cameras 112-118 may capture various combinations of reference points for calibration purposes. In various embodiments, reference points used for calibration may be implemented in accordance with embodiments described herein in association with a group 600 of reference points 602, 604, and 606 of FIG. 6.

Cameras 112-118 may also capture any combination of references points 132-138 associated with respective cameras 112-118, which may also include other known reference points in environment 100. For ease of illustration, a set of 4 reference cameras 112-118 are shown, there may be any number cameras present in environment 100 with respective reference points attached. As such, any one or more cameras in environment 100 may compute its own location in environment 100 based on a captured set of known reference points in environment 100. System 102 may then calibrate the one or more cameras based on their respective reference points captured in one or more images. Once calibrated, each camera accurately locates the positions of reference points in their fields of view.

As indicated herein, in various embodiments, the field view of a given reference camera is generally wide. The fields of view may also be adjustable and configured with a wider or narrower field of view. The particular field of view may vary, and will depend on the particular implementation. While the field of view of a given mobile camera is generally narrower than that of a reference camera, the field of view of a given mobile camera may also be adjustable and configured with a wider or narrower field of view, depending on the particular implementation. As indicated herein, mobile cameras are configured to follow action in environment 100, which may involve following one or more actors (hero actors, etc.). Also, any given cameras such as cameras 122 and 124 may split off to follow different moving objects (e.g., actors, hero actors, vehicles, animals, etc.).

In various embodiments, two or more mobile cameras such as cameras 122 and 124 may follow a given moving objects such as hero actors. While all reference and mobile cameras are capable of zooming and panning, cameras 112 and 118 generally maintain constant configurations over multiple scenes, while cameras 122 and 124 generally often change configurations, including zooming, panning, etc., in order to closely follow and capture details, reference points, etc. associated with target moving objects such as hero actors.

In various embodiments, having more cameras capturing more reference points optimizes the computing of the location and position or orientation of cameras 112-118, as more data is available to system 102. In various embodiments, system 102 computes the locations and positions or orientation of cameras 112-118 based on their respective reference points 132-138. In various embodiments the position of a given object (e.g., camera, reference marker, etc.) may includes its orientation relative to other objects in the environment.

As described in other example embodiments described herein, each camera of cameras 112-118 captures at least one image of a set of known reference points. As indicated above and described in more detail below, wand 600 of FIG. 6 may be used to implement such a set of reference points. For example, before calibration, a person may enter the live action set and place the set of references points in a location that is in the field of view of cameras 112-118. In various embodiments, the set of reference points remain in a predetermined or known position relative to the reference cameras throughout the calibration. Cameras 112-118 then each capture video or one or more images of the references points. System 102 then performs the calibration of cameras 112-118 by computing an aspect ratio between each pair of the reference points, and computes the location and orientation of cameras 112-118 based on the aspect ratios. The computed positions include the absolute location coordinates of cameras 112-118 in the physical space of the live action scene or set. System 102 computes the correct location in space, the correct scale, and the correct alignment.

In various embodiments, cameras 112-118 are positioned at four corners or positions in environment 100. In some embodiments, the coordinates of a given camera may be associated with and calibrated to be at the optical center of the lens of the given camera. The actual part of the given camera associated with a coordinate may vary, and will depend on the particular implementation. Cameras 122 and 124 being mobile may be located at or may relocated to any particular location in environment 100. Also, the particular coordinate system (e.g., Cartesian, polar, etc.) that system 102 uses in computations may vary, and will depend on the particular implementation.

In some embodiments, system 102 may calibrate cameras in a particular order. For example, system 102 may first calibrate two cameras such as cameras 112 and 114 having good angles and overlap in their fields of view. System 102 may compute the relative locations and orientations of the cameras from one to the other. System 102 may then calibrate other cameras such as cameras 116 and 118 in turn. In some embodiments, system 102 may start with any given pair and continue calibrating cameras pair-by-pair. This technique is beneficial in that any one or more cameras can be added to the overall group of cameras on the live action set. Such added cameras may be subsequently calibrated based on the calibration of existing cameras.

Embodiments described herein provide various benefits. For example, if cameras need to be recalibrated often, system 102 can quickly calibrate any already calibrated camera or newly added or moved camera to be calibrated based on existing calibrated cameras. This saves valuable set up time for filming on the live action film set or stage.

In various embodiments, in addition to system 102 calibrating cameras 112-118 based on a particular set of reference points, system 102 may also calibrate cameras 112-118 based on other known reference points such as reference points 132-138 that are attached to cameras 112-118. For example, if system 102 has computed relative locations of reference points 136 and 138, and one or more other known reference points in environment 100, system 102 may calibrate cameras 112 and 114 based on those reference points captured by cameras 112 and 114 using associated aspect ratios.

In some embodiments system 102 may also utilize one or more inertial measurement unit (IMU) sensors in each camera to estimate a location and orientation of each camera to supplement the calibration information. IMU sensors may include magnetometers, accelerometers, etc. The associated IMU measurements in combination with associated aspect ratio measurements helps system 102 to compute accurate orientation of cameras 112-118.

These additional techniques are beneficial in optimizing the calibration of cameras 112-118. By utilizing different calibration techniques, system 102 accurately calibrates the location and orientation of different cameras despite potential occlusion of reference points and varying lighting conditions.

Embodiments described herein provide various benefits. For example, embodiments enable stage sets for motion picture productions to use fewer cameras (e.g., 8 cameras instead of 60 cameras), because the mobile cameras such as mobile cameras 122 and 124 are able to capture video including images at multiple locations. Mobile cameras 122 and 124 are able to follow target objects such as hero actors while avoiding occlusions. As described in more detail herein, system 102 computes the locations of mobile cameras 122 and 124 based the locations of reference cameras 112-118. As such, even if mobile cameras 122 and 124 are often moving and changing locations, system 102 continually computes the locations and orientation of cameras 122 and 124. As such, fewer cameras are needed. Fewer cameras allow for smaller film crews, which results in substantial cost reductions. Fewer cameras also allow for less hardware gear, which substantially reduces costs and set up times.

Figure 3:
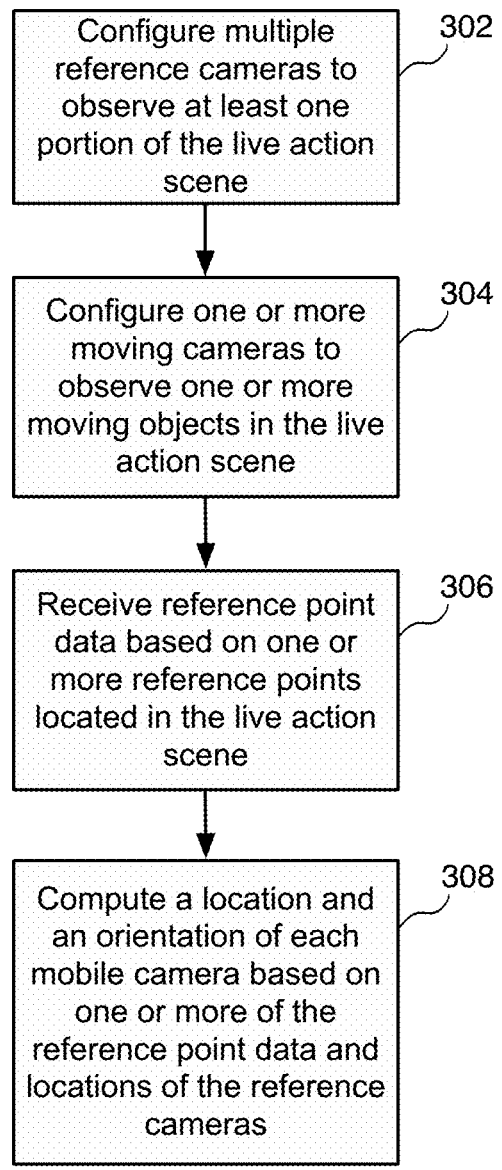
FIG. 3 is an example flow diagram for calibrating cameras in a live action scene using drones, according to some embodiments.

FIG. 3 is an example flow diagram for calibrating cameras in a live action scene using drones, according to some embodiments. Referring to both FIGS. 1, 2, and 3, a method is initiated at block 302, where a system such as system 102 configures multiple reference cameras such as cameras 112-118 to observe at least one portion of a live action scene such as environment 100 of FIG. 1. In various embodiments, each reference camera observes a portion or portions of the live action scene in that each reference camera captures and stores images, series of images, and/or videos of the live action scene, including capturing and storing reference markers in such images and/or videos. As described in more detail herein, in various embodiments, reference cameras 112-118 are configuring to observe at least three known reference points located in the live action scene and to observe one or more reference points associated with one or more mobile cameras having unconstrained motion. As indicated herein, in various embodiments, each reference camera of the set of reference cameras 112-118 is at a known location and position relative to one or more other reference cameras in the live action scene. Also, in various embodiments, each reference camera 112-118 is mounted on one or more rigid structures, such as tripods. As indicated herein, cameras 112-118 are located at various points of environment 100 with wide fields of view in order capture various different perspectives of environment 100.

At block 304, system 102 configures one or more moving or mobile cameras such as mobile cameras 122 and 124 to observe one or more mobile objects or moving objects in one or more portions of the live action scene that one or more of reference cameras 112-118 also observe. In various embodiments, each mobile camera observes a portion or portions of the live action scene in that each mobile camera captures and stores images, series of images, and/or videos of the live action scene, including capturing and storing reference markers in such images and/or videos. In various embodiments, mobile cameras 122 and 124 have unconstrained motion and are configured to observe one or more moving objects in the live action scene and to observe at least three known reference points associated with the reference cameras. In various embodiments, the mobile objects are moving objects in that they may move from one location on in the live action scene to another location in the live action scene. For example, a given moving object may be hero actor, vehicle transporting a hero actor, etc., which may from one location to another in the live action scene. As indicated herein, in various embodiments, each mobile camera is mobile in that each mobile camera follows action in the live action scene. In various embodiments, a given mobile camera may be associated with and mounted on a mobile apparatus. For example, in various embodiments, each mobile camera may be associated with and mounted on a mobile vehicle such as a drone, as shown in FIGS. 1 and 2, where mobile cameras 122 and 124 are attached to respective drones 126 and 128. The particular type of mobile apparatus may vary, depending on the particular implementation. For example, in various embodiments, mobile cameras 122 and 124 and/or other mobile cameras may be attached to moving platforms on a rail or wheels. In various embodiments, each mobile camera may be associated with and mounted on a mobile vehicle such as an automobile, a train car on a rail, etc. In various embodiments, each mobile camera may be associated with and mounted on a camera stabilizer mount, a boom, etc. and hand-carried. The particular means of movement may vary and will depend on the particular implementation.

As indicated herein, in various embodiments, at least one moving object of the moving objects in the live action scene is a person such as person 130 shown in FIGS. 1 and 2, which may be a hero actor, for example. In various embodiments, mobile cameras 122 and 124 are configured to capture objects in environment 100 such as person 120. Mobile cameras 122 and 124 are configured to capture details of person 130, including any one or more reference points such as reference point 140. Mobile cameras 122 and 124 are configured to self-adjust including zoom, pan, etc. in order to capture such details.

At block 306, system 102 obtains or receives reference point data in association with one or more mobile cameras such as mobile cameras 122 and 124. In various embodiments, the reference point data may be in association the one or more reference cameras such as reference cameras 112-118. In various embodiments, the reference point data is based on one or more reference points located in the live action scene, where the one or more reference points are captured by mobile cameras. In various embodiments, the reference point data may be based on reference points coupled to one or more reference cameras. In various embodiments, the reference point data is based on at least three known reference points in the live action scene and one or more reference points associated with one or more mobile cameras. For example, in various embodiments, the reference point data may be based on reference points coupled to mobile cameras 122 and 124. As indicated above, in various embodiments, at least a portion or some of the one or more known reference points such as reference points 132-138 are coupled to at least a portion of the one or more reference cameras 112-118.

In various embodiments, the reference point data is based on at least three known reference points. Such the three known reference points may include, for example, one or more of reference points 132-138 attached to respective reference cameras 112-118 of FIG. 1, any one or more other known reference points located in the live action scene (such as any one or more reference points 602, 604, and 606 of wand 600 of FIG. 6), and any combination thereof. In various embodiments, system 102 computes a location and an orientation of at least camera 902 and/or 904 based on the reference point data or combination thereof. Also, in various embodiments, at least a portion (e.g., a subset) of the reference points in the live action scene are coupled to the one or more moving objects, such as person 130. Further example embodiments directed to the reference point data are described in detail herein.

At block 308, system 102 computes a location and an orientation of each mobile camera based on one or more of the reference point data and the locations of one or more of reference cameras 112-118. In various embodiments, system 102 computes the location and orientation of the mobile cameras in real time as the mobile cameras are capturing footage of the live action scene. Note that As described in more detail herein, once system 102 computes the locations and orientation of one or more of reference cameras 112-

118, system 102 may compute the locations of mobile cameras 122 and 124 based on known reference points captured by mobile cameras 122 and 124. As described in more detail herein, system 102 computes the locations and orientation of mobile cameras 122 and 124 in a similar manner to computing the locations and orientation of reference cameras 112-118. In various embodiments, the reference point data may include the locations of one or more of reference points 132-138. In various embodiments, system 102 computes the location and an orientation of each mobile camera based the reference point data and/or one or more locations of one or more reference cameras 112-118.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

In a particular example embodiment, system 102 computes the locations and orientation of any one or more of reference cameras 112-118 based on reference point data in association with reference cameras 112-118 and based on any one or more techniques described herein. System 102 then computes the locations of mobile camera 122 and/or mobile camera 124 based on reference point data in association with respective mobile camera 122 and/or mobile camera 124 and based on the locations of one or more of reference cameras 112-118. In other words, system 102 computes the locations of one or more of mobile cameras 122 and 124 based on the locations of one or more reference cameras 112-118.

In some scenarios, the locations of one or more drones with cameras may be known at one point in time. In a subsequent point in time, however, a given drone may fly to a new location where its location becomes unknown or uncertain. This may occur, for example, if the drone flies into a new area (e.g., from outside to the inside of a cave, indoor area, new indoor area, etc.). Consequently, the location of the drone relative to one or more associated known referent points (e.g., outside the cave) becomes unknown or uncertain. In this scenario, in various embodiments, a camera attached to the drone may capture new known reference points in the new area (e.g., in the cave). In various embodiments, the camera observes/captures at least three known reference points associated with the new known reference points. System 102 may then process new reference point data based on those new known referenced points captured by the camera. In various embodiments, the reference point data is based on at least three known reference points. System 102 processes the reference point data to recalibrate, including computing the location and orientation of the camera on the drone relative to the newly associated reference points, according to embodiments described herein (e.g., based on reference point data and locations of the known reference points.

Figure 4:
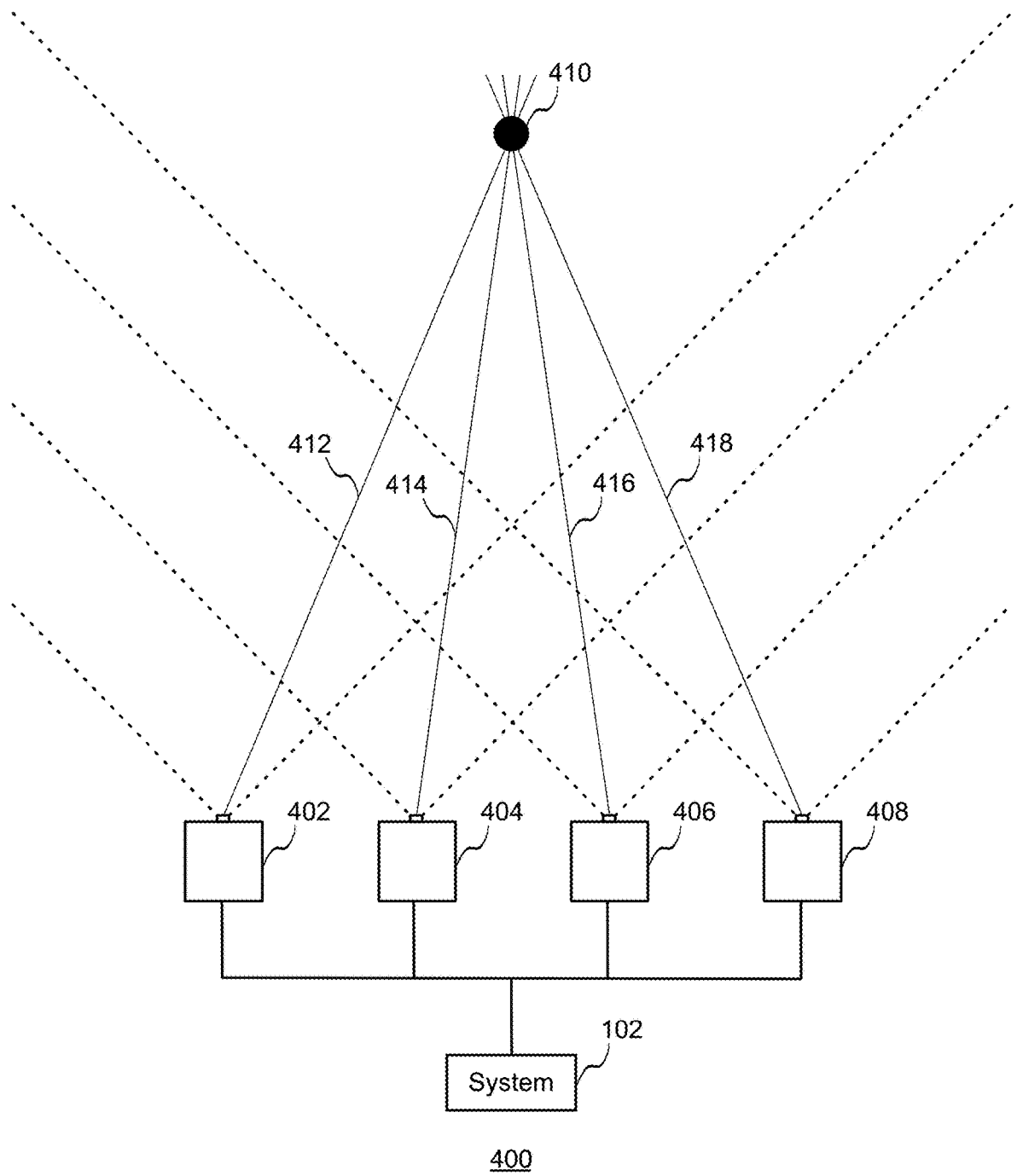
FIG. 4 is a block diagram of an example environment for calibrating cameras in a live action scene, according to some embodiments.

FIG. 4 is a block diagram of an example environment 400 for calibrating cameras in a live action scene, according to some embodiments. Shown are system 102, cameras 402, 404, 406, and 408, and reference point 410. Any one or more of cameras 402-408 may be used to represent any one or more of cameras 112-118 in embodiments described herein.

As described in more detail below, system 102 receives videos including images from multiple cameras such as cameras 402-408. As described in more detail herein, system 102 utilizes cameras 402-408 to locate and track the reference points such as reference markers on the live action scene or set. In various example embodiments, reference points may be also referred to as reference markers. Embodiments described herein calibrate cameras 402-408, which improve the accuracy of system 102 locating and tracking reference points.

Each of cameras 402-408 has a field of view (indicated by dotted lines) that enables each camera to capture video and/or images of objects in a live action scene. In various embodiments, cameras 402-408 are stationary at the point of their calibration until they need to be moved for subsequent scene changes. Cameras 402-408 may be attached to tripods or other camera stabilizing equipment. In various embodiments, the positions of and orientations of cameras 402-408 may vary, and will depend on the particular implementation.

In various embodiments, if a particular camera is moved (e.g., used in another location of the set, used in another set, etc.), that camera may then recapture reference point 410 and/or capture and collect other reference points. System 102 may then recalculate the new position of the camera.

Cameras 402-408 may be any suitable cameras, including cameras dedicated to tracking reference points (e.g., active reference markers, passive reference markers, etc.). Such cameras may also include infrared cameras and other digital cameras. In some embodiments where a reference point is an active reference marker, the reference marker emits an infrared light. At least some cameras may have a narrow-pass filter to detect and capture the infrared light, which system 102 analyzes to compute the location of the active reference marker. Such as an active reference marker may be used to implement any one or of reference points described herein.

In various embodiments, objects may include scene props and actors, and these objects may have reference points such as reference point 112 attached to them for tracking live action tracking purposes. In various embodiments, the reference points may be any type of reference or position that system 102 identifies using any suitable approach and techniques. Such techniques may vary and the particular techniques used will depend on the particular implementation. For example, system 102 may use techniques involving image recognition, pattern recognition, reference markers, radio-frequency identification (RFID), wireless beacons, etc.

As described in more detail herein, system 102 causes cameras 402-408 to project respective rays 412, 414, 416, and 418 into the space and through reference point 410. For ease of illustration, as indicated above, one reference point 410 is shown for the calibration of cameras 104-110. There may any number of reference points used for the calibration of cameras 104-110. The particular number of reference points in a given live action scene may vary and will depend on the implementation. For example, there may be tens or hundreds of reference points on a given live action scene. In some embodiments, system 102 may cause cameras 402-408 to also project other respective rays into the space and through other reference points.

In various embodiments, the reference point data is based on at least three reference points in the live action scene. In various embodiments, the three reference points are known relative to each other. In some embodiments, the three reference points may be stationary. In various embodiments, the three reference points are arranged in a predetermined pattern. Example embodiments directed to the calibration of cameras using multiple reference points arranged in a predetermined pattern are described below in connection with FIGS. 6 and 7.

In various embodiments, system 102 associates each reference point in a given image with a ray from each camera of a set of different cameras that capture such reference points in their respective image(s). System 102 searches for and identifies intersections of rays 412-418 to identify particular reference points. In various embodiments, system 102 analyzes information associated with each intersection to identify the respective reference point, respective rays that intersect the reference point, and respective cameras associated with such rays.

Rays 412-418 may also be referred to as epipolar lines 412-418. Each epipolar line 412-418 is a straight line of intersection in an epipolar plane, where each epipolar line 412-418 represents a different point of view of a respective camera. In various scenarios, there may be tens of cameras that capture tens or hundreds of reference points. In various scenarios, system 102 may perform thousands or millions of calculations to analyze different intersections associated with different references points in a live action scene.

As system 102 locates the different reference points such as reference point 410 based on the epipolar lines 412-418, system 102 computes or solves for the 3D coordinates and orientation of each of cameras 402-408. Such epipolar geometry describes the relationships between different cameras 104-110, including their respective points of view.

For ease of illustration, one system 102 and four cameras 402-408 are shown. System 102 may represent multiple systems, and cameras 402-408 may represent any number of cameras. In other implementations, environment 100 may not have all of the components shown and/or may have other elements including other types of elements instead of, or in addition to, those shown herein.

While system 102 performs embodiments described herein, in other embodiments, any suitable component or combination of components associated with system 102 or any suitable processor or processors associated with system 102 may facilitate performing the embodiments described herein. Various example embodiments directed to environment 100 for calibrating cameras 402-408 are described in more detail herein.

In various embodiments, the images are taken by the cameras within a predetermined time frame. For example, in some embodiments, the predetermined time frame may be a predetermined number of hours (e.g., 1 hour, 10 hours, 24 hours, etc.), or predetermined number of days (e.g., 1 day, 7 days, 365 days, etc.). In some embodiments, the predetermined time frame may be a based on a predetermined condition. For example, a condition may be that the cameras being calibrated have not moved (e.g., changed location and orientation) since the beginning of the calibration process. For example, as long as the cameras have not moved, the cameras may continue to take images to be used for calibration. If and when a given camera moves, the cameras may continue to captures images, but system 102 will use such images in a new calibration based on the new or current positions of the cameras.

In some embodiments, system 102 performs embodiments described herein in real time. In some embodiments, system 102 need not perform some steps associated with embodiments described herein at the same time as the images are captured. This is because there may be some delay from the processing and workflow steps before calibration is completed.

Figure 5:
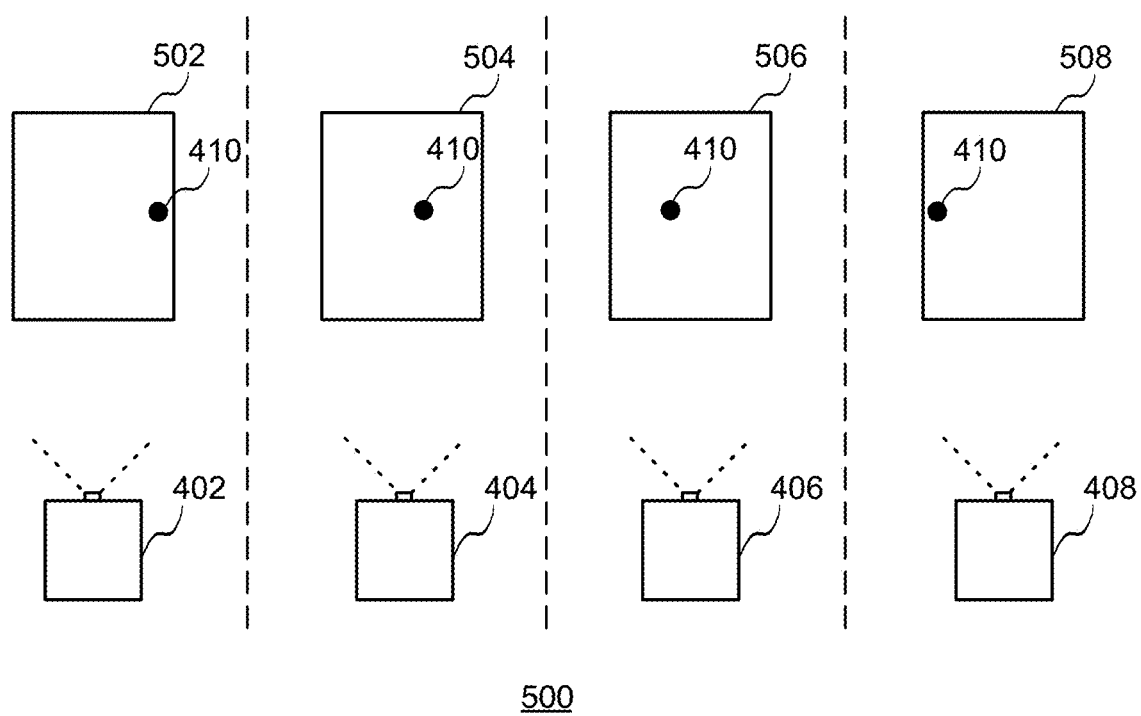
FIG. 5 is a block diagram of an example scenario including a reference point captured by cameras in a live action scene, according to some embodiments.

FIG. 5 is a block diagram of an example scenario 500 including a reference point captured by cameras in a live action scene, according to some embodiments. Shown are cameras 402, 404, 406, and 408, each of which are capturing respective images 502, 504, 506, and 508 of reference point 410. While one reference point 410 is shown, the number of reference points captured by a given camera may vary, and the number will depend on the particular implementation.

As shown, images 502-508 show reference point 410 in a different location in the different image frames depending on the relative location of reference point 410 to the respective camera in the physical live action scene. In various embodiments, system 102 sends images 502-508 to a performance capture system, which may be remote to system 102 or integrated with system 102.

In various embodiments, cameras 402-408 have a known projection matrix for mapping reference points in three-dimensions (3D) to two-dimensional (2D) points in an image. In various embodiments, system 102 identifies reference point 410 in 2D in an image frame from 3D in the live action scene. System 102 then causes each camera to project a ray into the space and through reference point 410 and/or other references points in the image. As such, all the cameras see the same reference point 410 in a different place in their respective 2D image frame. As shown, cameras 402-408 see the same reference point 410 but in different positions in their respective image frame. The rays projected by the different cameras 402-408 intersect at reference point 410 in the 3D space, and system 102 computes these intersections.

As indicated above, while some embodiments are described herein in the context of a single reference point, these embodiments and others also apply to multiple reference points. For example, in various embodiments, each camera may capture 3 reference points attached to a wand. System 102 may analyze each reference point individually and together as a group, including their relative positions from each other. Further examples of such embodiments are described in more detail herein.

Figure 6:
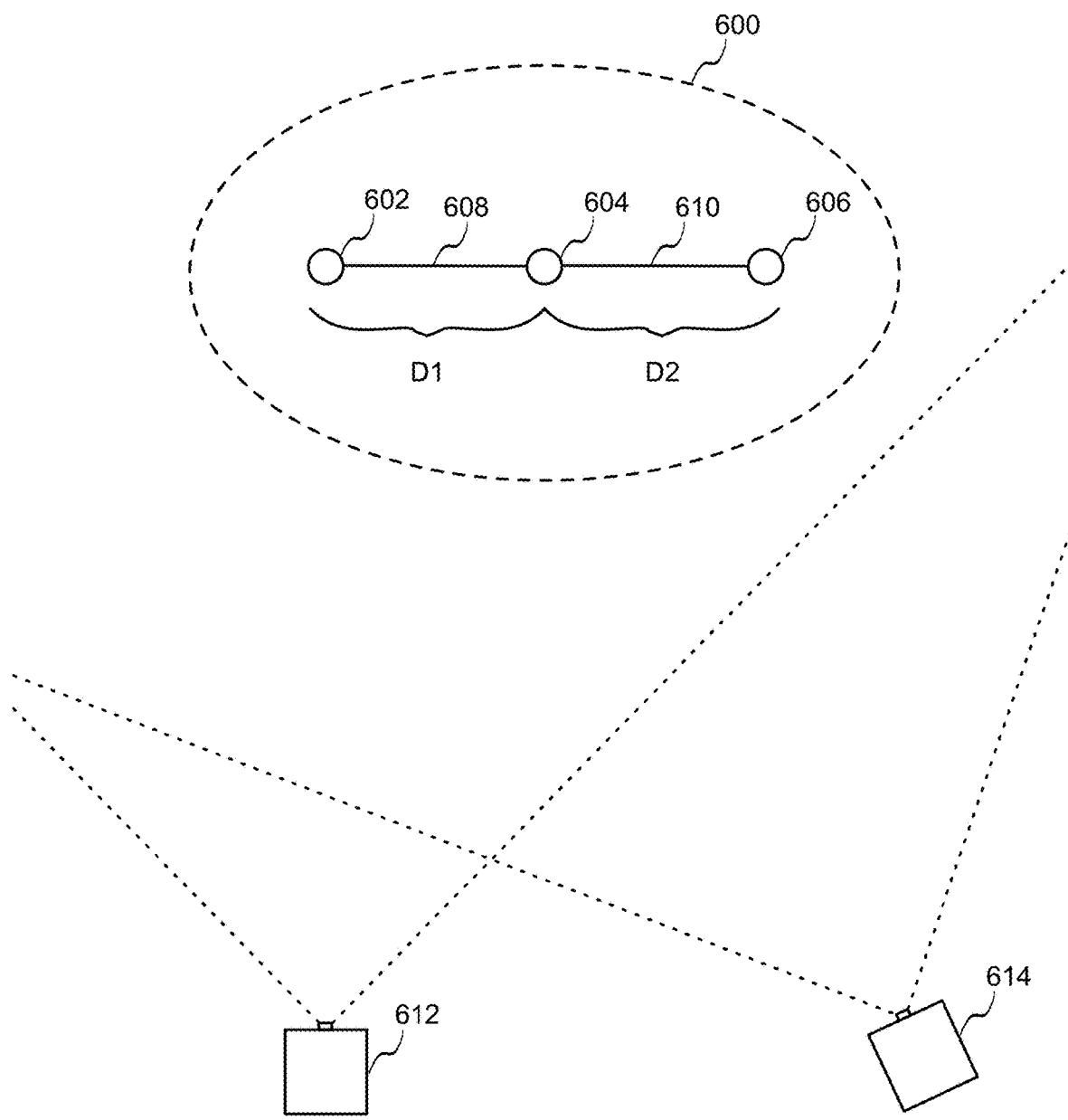
FIG. 6 is a block diagram of a group of reference points in a live action scene, where the reference points are arranged in a straight line, according to some embodiments.

FIG. 6 is a block diagram of a group 600 of reference points 602, 604, and 606 in a live action scene, where reference points 602, 604, and 606 are arranged in a straight line, according to some embodiments. As shown, group 600 includes reference points 602, 604, and 606. In various embodiments, reference points 602, 604, and 606 form a straight line.

In various embodiments, reference points 602, 604, and 606 are attached to a rigid form. For example, in the example embodiment shown, reference points 602, 604, and 606 are attached to respective rigid arms 608 and 610, which form a straight line of a wand. As such, group 600 of reference points may also be referred to as wand 600. While three reference points 602, 604, and 606 are shown, the number of reference points on wand 600 may vary, and the number will depend on the particular implementation. For example, there may be 4 references points or 5 reference points, etc., attached to wand 600.

In various embodiments, reference points 602, 604, and 606 of wand 600 are known or predetermined and their distances from each other are invariant or predetermined/known and/or do not change. In other words, the absolute length of wand 600 is known, including distances D1 and D2. In the example shown, in various embodiments, reference points 602, 604, and 606 of wand 600 are equidistant, were the distance D1 between reference point 602 and reference point 604 is substantially equal to the distance D2 between reference point 604 and reference point 606. In various embodiments, the distances between reference points 602, 604, and 606 need not be equidistant. For example, the distance D1 and the distance D2 may be different as long as the ratio between distances D1 and D2 are known or can be determined using the known length of wand 600.

In some embodiments, system 102 collects thousands of frames from cameras 612 and 614 for one calibration of these cameras. In some embodiments, system 102 may analyze the reference points of wand 600 at different locations and orientations in the live action scene in order to optimize calibration measurements. In various embodiments, by having at least three reference markers 602-606, system 102 accurately computes the orientation of wand 600 regardless of its relative orientation to a given camera.

In various embodiments, system 102 computes the location and orientation of cameras 612 and 614 based the reference point data and on one or more locating techniques such as triangulation, trilateration, etc. In various embodiments where system applies a triangulation technique, system 102 locates the reference points in one or more images. System 102 then computes an aspect ratio of multiple reference points in the one or more images. In embodiments where system 102 analyzes a group of 3 reference points on a wand. Example embodiments directed to a wand with reference points are described below in connection with FIG. 4. In various embodiments, system 102 computes the aspect ratio of the three reference points in the one or more images. System 102 then triangulates each camera based on the aspect ratio.

Figure 7:
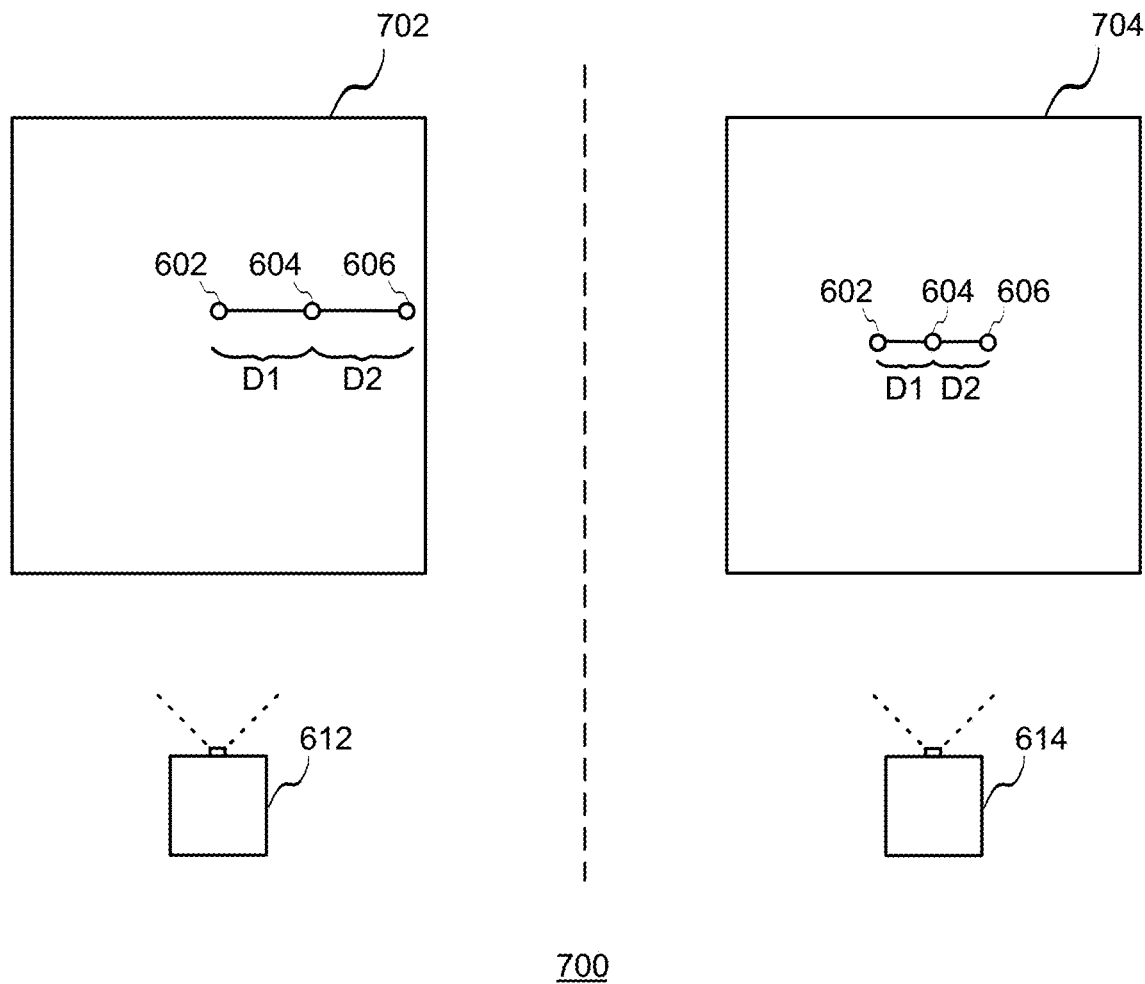
FIG. 7 is a block diagram of an example scenario including reference points in images captured by cameras in a live action scene, according to some embodiments.

FIG. 7 is a block diagram of an example scenario 700 including reference points in images captured by cameras in a live action scene, according to some embodiments. Shown are cameras 612 and 614, each of which are capturing respective images 702 and 704 of reference points 602, 604, and 606.

In this example embodiment, while distances D1 and D2 are equidistant in the 3D space, distances D1 and D2 form an aspect ratio in a 2D image, where distances D1 may differ from distance D2 in the 2D image depending on the point of view of a given camera. For example, images 702 and 704 show reference points 602-606 in a different location in the different image frames depending on the relative location of reference 602-606 to the respective camera 612 or 614 in the physical live action scene. As shown, comparing images 702 and 704, the reference points 602-606 are farther apart from each other in image 702 compared to their relative locations in image 704, where there may be some foreshortening due to the camera angle. Also, the position of the group of reference points 602-606 are positioned more on the right portion of image 702, and are positioned more in the center portion of image 704.

In various embodiments, system 102 computes the distance between each pairing of reference points 602-606, including all combinations. In some embodiments, system 102 generates a graph of the distance between each reference point to every other reference point of wand 600. System 102 computes or ascertains the location of each of the reference points of wand 600 and the orientation of the reference points of wand 600. Based on the location and orientation of reference points 602-606, system 102 computes the location and orientation of cameras 612 and 614 and any other cameras capturing images of reference points 602-606.

In various embodiments, system 102 sends images 702 and 704 to a performance capture system, which may be remote to system 102 or integrated with system 102. In various embodiments, system 102 computes or ascertains the location and orientation of each camera (e.g., camera 612, camera 614, etc.) based on the aspect ratio of distances D1 and D2.

While the reference points of group 600 are shown to be arranged in a straight line, the particular arrangement and relative positions of the reference points may vary and will depend on the particular implementation. For example, a given group of reference points used for calibration of cameras may form a cluster of reference points, where the reference points are attached to a rigid form having a three-dimensional shape. As such, the reference points may form a three-dimensional pattern.

Figure 8:
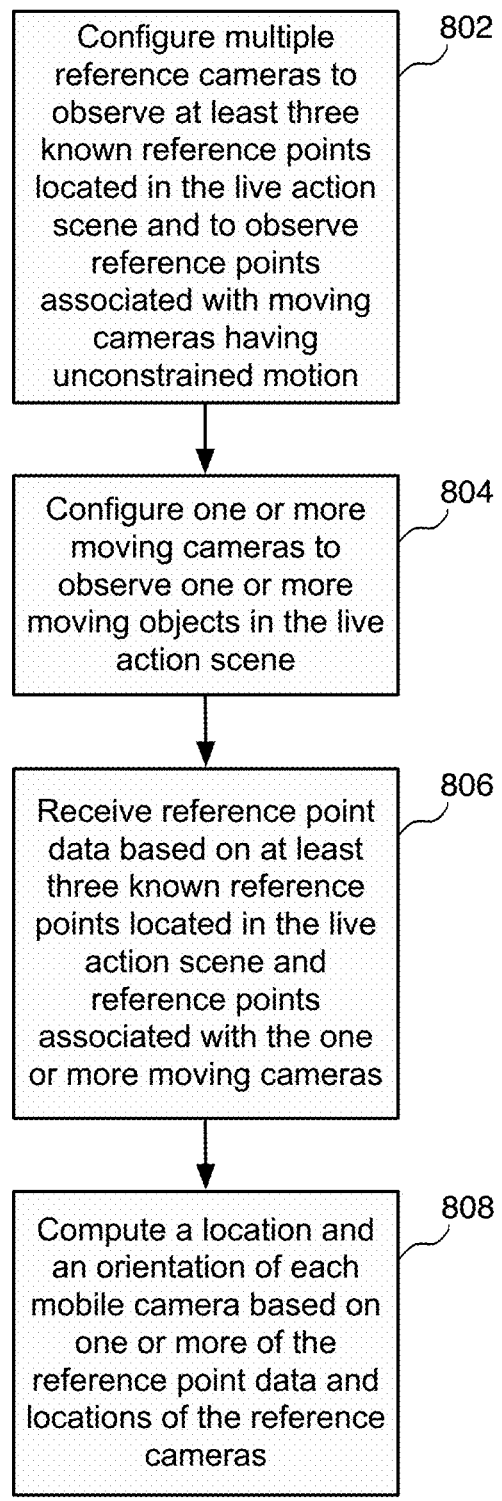
FIG. 8 is an example flow diagram for calibrating cameras in a live action scene using drones, according to some implementations.

FIG. 8 is an example flow diagram for calibrating cameras in a live action scene using drones, according to some implementations. Referring to both FIGS. 1 and 8, a method is initiated at block 802, where a system such as system 102 configures multiple reference cameras to observe at least three known reference points located in the live action scene and to observe one or more reference points associated with one or more moving cameras having unconstrained motion.

At block 804, system 102 configures the one or more moving cameras to observe one or more moving objects in the live action scene.

At block 806, system 102 receives reference point data in association with one or more of the reference cameras. In various embodiments, the reference point data is based on at least three known reference points located the live action scene and based on the one or more reference points associated with the one or more moving cameras.

At block 808, system 102 computes a location and an orientation of each of the moving cameras based on one or more of the reference point data and one or more locations of one or more of the reference cameras.

In various embodiments, reference cameras may visually detect a reference point on a drone and/or a reference point on a camera mounted on the drone that is hovering in a particular location. In accordance with various embodiments described herein, system 102 computes the locations and orientation or position of the reference cameras in the live action scene and their locations and orientation relative to each other. In various embodiments, the reference cameras are stereoscopic. Based on associated reference point data, system 102 may compute the location of the mobile camera on the drone relative to the known locations of the reference cameras. System 102 may direct the drone where to go and when. Because system 102 may compute the location of the mobile camera, the mobile camera can zoom in on a given object without concern for losing track of other cameras. This is because system 102 continues to track the mobile camera using the reference cameras.

In some embodiments, system 102 may compute the location of a given drone or estimate the location of the drone based on the previously known location and subsequent movement from that location (e.g., distance and direction traveled, etc.). System 102 may also obtain any new reference point data based on any new reference points captured by the drone and use such reference point data to refine estimations of the location of the drone.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 9:
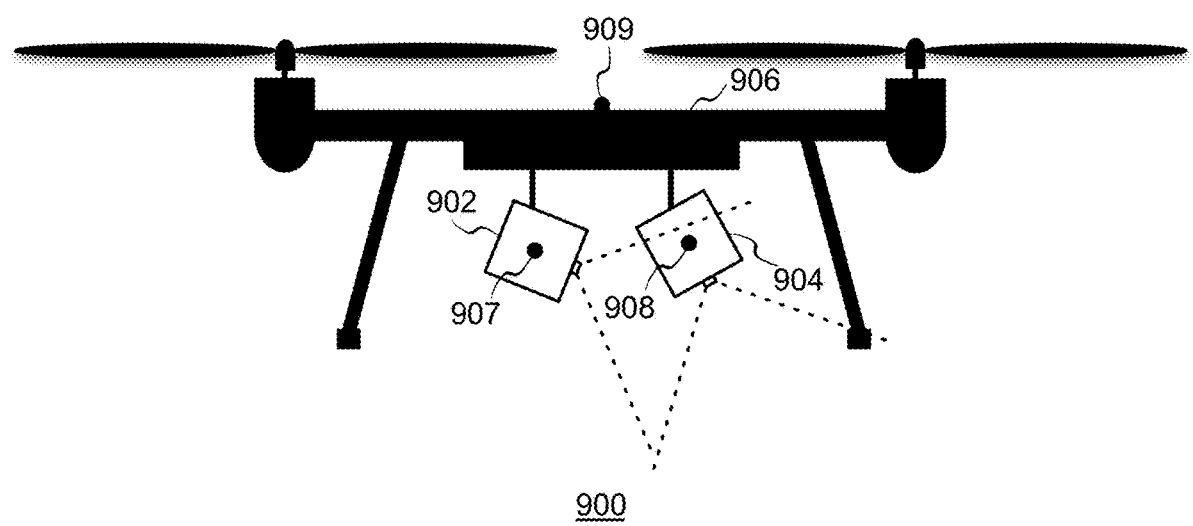
FIG. 9 is a block diagram of example cameras coupled to a drone, according to some embodiments.

FIG. 9 is a block diagram of example assembly 900, which includes cameras 902 and 904 coupled to a mobile apparatus such as a drone 906, according to some embodiments. Shown is a reference point 907 coupled to camera 902, a reference point 908 coupled to camera 904, and a reference point 909 coupled to drone 906. While some embodiments are described in the context of a drone such as drone 906, these embodiments and other also apply to other mobile apparatuses (e.g., vehicles, drones, etc.) that carry cameras to follow action of the live action scene. The apparatus or assembly 900 applies to other embodiments described herein.

In various embodiments, by having at least two mobile cameras coupled to a single drone, one camera such as camera 902 may be configured to capture one or more reference points attached to a moving object such as a hero actor. In other words, camera 902 is configured to follow the action of a scene, including being configured to observe one or more moving objects (e.g., actors, mobile vehicles, etc.) in the live action scene. Camera 902 may also be referred to as capture camera 902. The other camera such as camera 904 may be configured to observe at least three known reference points located in the live action scene. Camera 904 may also be referred to as calibration camera 904. In various embodiments, camera 904 may be configured to capture one or more reference points attached to another camera such as reference points attached to any one or more of the cameras of FIGS. 1 and 2. Such cameras may include mobile cameras attached to other drones and/or reference cameras (e.g., on the ground, on a platform, etc.). Camera 904 may be configured to also capture other reference points in the live action scene, such as reference points of wand 600 of FIG. 6, etc.

In various embodiments, each camera 902 and 904 may be independently configured, such that cameras 902 and 904 operate independently from each other. In various embodiments, cameras 902 and 904 different fields of view. For example, camera 902 may be configured with a narrow field of view to focus on details of moving objects such as a person or hero actor. Also, camera 904 may be configured with a wide field of view to capture more reference points such as a reference point associated with another mobile camera on another drone, as well as other reference points in the live action scene.

Figure 10:
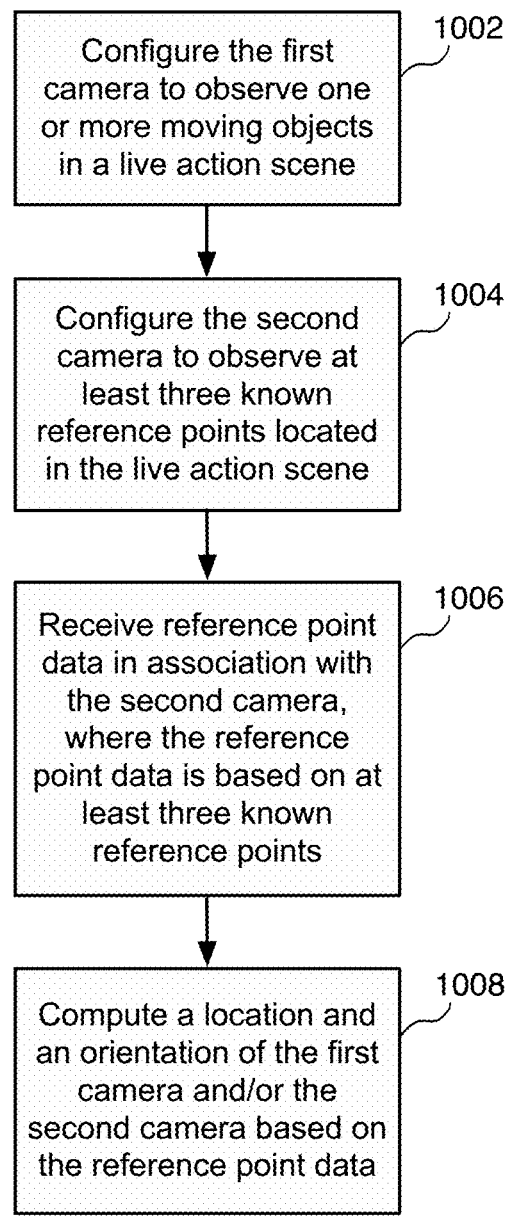
FIG. 10 is an example flow diagram for calibrating cameras in a live action scene using drones, according to some implementations.

FIG. 10 is an example flow diagram for calibrating cameras in a live action scene using drones, according to some implementations. Referring to both FIGS. 1, 9, and 10, a method is initiated at block 1002, where a system such as system 102 configures a first camera such as capture camera 902 to observe one or more moving objects in a live action scene.

At block 1004, system 102 configures a second camera such as calibration camera 904 to observe at least three known reference points located in the live action scene.

At block 1006, system 102 receives reference point data in association with the second camera. In various embodiments, the reference point data is based on at least three known reference points. For example, the three known reference points may include one or more reference points 602, 604, and 606 of wand 600 of FIG. 6, one or more of reference points 132, 134, 136, and 138 attached to respective reference cameras 112, 114, 116, and 118 of FIG. 1, one or more other known reference points located in the live action scene, and any combination thereof.

At block 1008, system 102 computes a location and an orientation of the first camera and/or the second camera based on the reference point data.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 11:
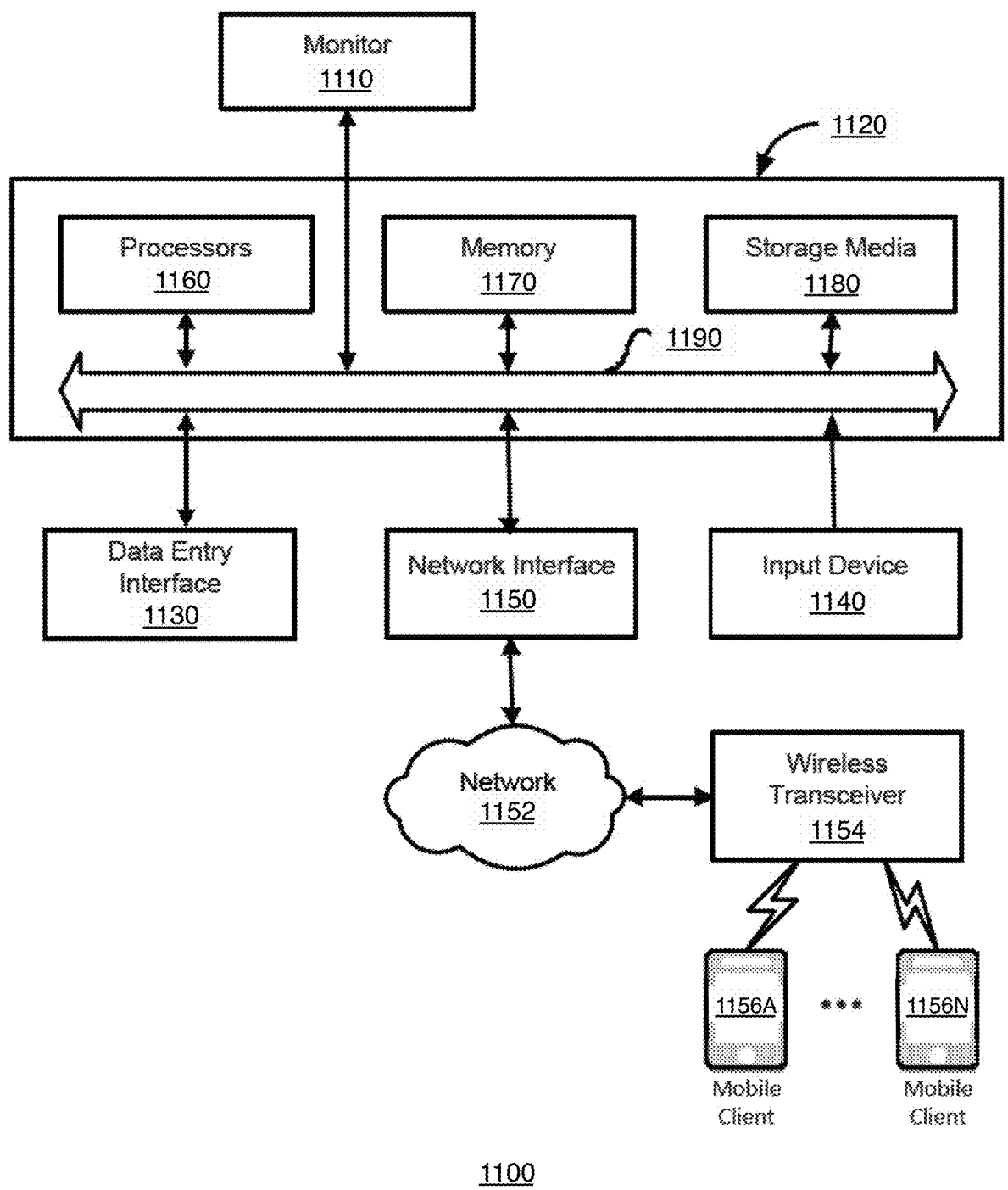
FIG. 11 is a block diagram of an example computer system, which may be used for embodiments described herein.

FIG. 11 is a block diagram of an example computer system 1100, which may be used for embodiments described herein. Computer system 1100 is merely illustrative and not intended to limit the scope of the claims. One of ordinary skill in the art would recognize other variations, modifications, and alternatives. For example, computer system 1100 may be implemented in a distributed client-server configuration having one or more client devices in communication with one or more server systems.

In one exemplary implementation, computer system 1100 includes a display device such as a monitor 1110, computer 1120, a data entry interface 1130 such as a keyboard, touch device, and the like, a user input device 1140, a network communication interface 1150, and the like. User input device 1140 is typically embodied as a computer mouse, a trackball, a track pad, wireless remote, tablet, touch screen, and the like. Moreover, user input device 1140 typically allows a user to select and operate objects, icons, text, characters, and the like that appear, for example, on the monitor 1110.

Network interface 1150 typically includes an Ethernet card, a modem (telephone, satellite, cable, ISDN), (asynchronous) digital subscriber line (DSL) unit, and the like. Further, network interface 1150 may be physically integrated on the motherboard of computer 1120, may be a software program, such as soft DSL, or the like.

Computer system 1100 may also include software that enables communications over communication network 1152 such as the HTTP, TCP/IP, RTP/RTSP, protocols, wireless application protocol (WAP), IEEE 902.11 protocols, and the like. In addition to and/or alternatively, other communications software and transfer protocols may also be used, for example IPX, UDP or the like. Communication network 1152 may include a local area network, a wide area network, a wireless network, an Intranet, the Internet, a private network, a public network, a switched network, or any other suitable communication network, such as for example Cloud networks. Communication network 1152 may include many interconnected computer systems and any suitable communication links such as hardwire links, optical links, satellite or other wireless communications links such as BLUETOOTH™, WIFI, wave propagation links, or any other suitable mechanisms for communication of information. For example, communication network 1152 may communicate to one or more mobile wireless devices 1156A-N, such as mobile phones, tablets, and the like, via a base station such as wireless transceiver 1154.

Computer 1120 typically includes familiar computer components such as a processor 1160, and memory storage devices, such as a memory 1170, e.g., random access memory (RAM), storage media 1180, and system bus 1190 interconnecting the above components. In one embodiment, computer 1120 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 1170 and storage media 1180 are examples of tangible non-transitory computer readable media for storage of data, audio/video files, computer programs, and the like. Other types of tangible media include disk drives, solid-state drives, floppy disks, optical storage media and bar codes, semiconductor memories such as flash drives, flash memories, random-access or read-only types of memories, battery-backed volatile memories, networked storage devices, Cloud storage, and the like.

Figure 12:
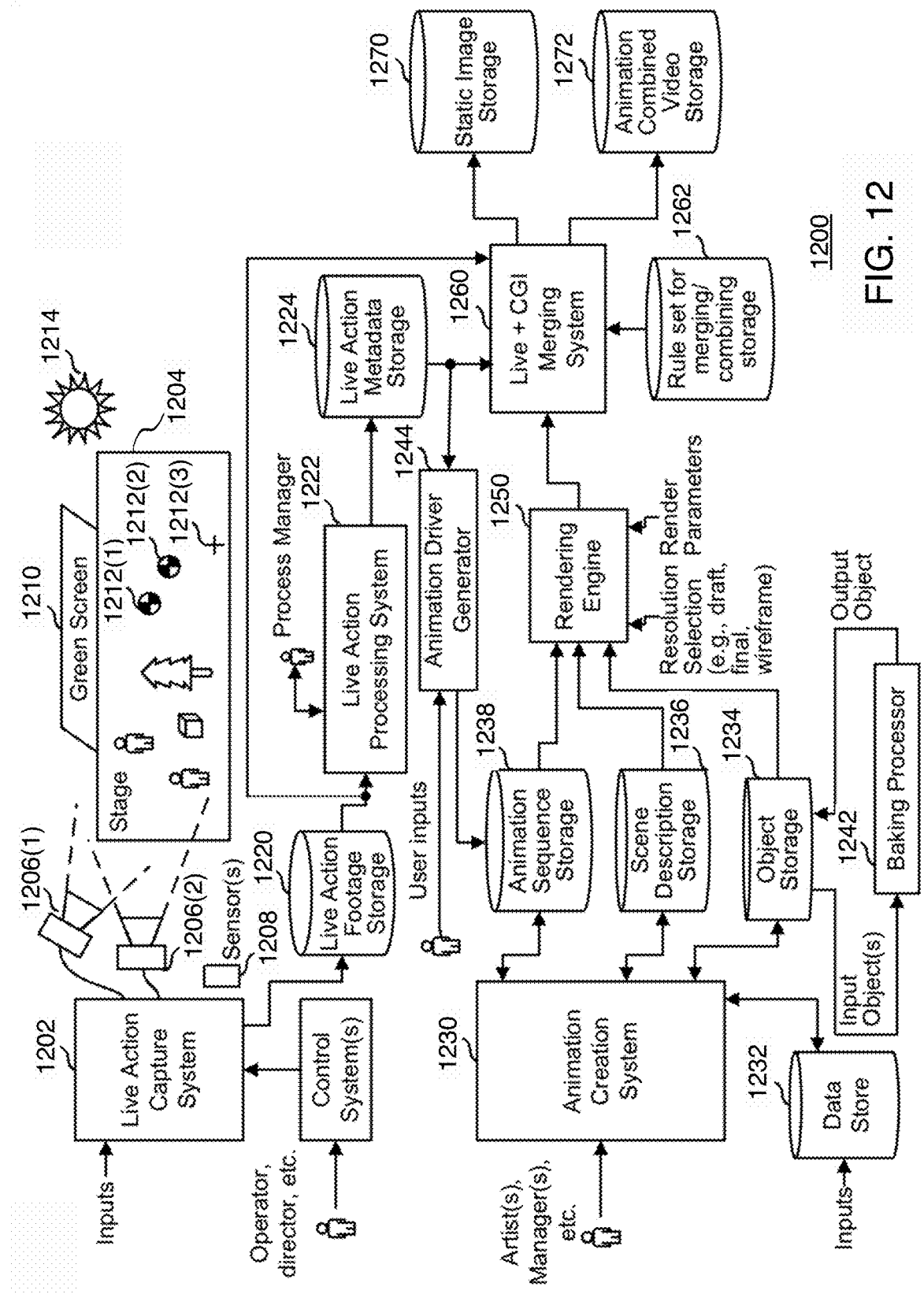
FIG. 12 is a block diagram of an example visual content generation system, which may be used to generate imagery in the form of still images and/or video sequences of images, according to some embodiments.

FIG. 12 is a block diagram of an example visual content generation system 1200, which may be used to generate imagery in the form of still images and/or video sequences of images, according to some embodiments. The visual content generation system 1200 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 1200 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 1200 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920 pixel columns by 1280 pixel rows. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views.

A stored video sequence might include a plurality of images such as the still images described above, but where each image of the plurality of images has a place in a timing sequence, and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 80 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, might specify positions of objects and/or lighting, as well as a camera viewpoint, and a camera view plane. Taking all of those as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine may perform ray tracing where a pixel color value is determined by computing which objects lie along a ray traced in the scene space from the camera viewpoint through a point or portion of the camera view plane that corresponds to that pixel. For example, a camera view plane may be represented as a rectangle having a position in the scene space that is divided into a grid corresponding to the pixels of the ultimate image to be generated. In this example, a ray defined by the camera viewpoint in the scene space and a given pixel in that grid first intersects a solid, opaque, blue object, and the given pixel is assigned the color blue. Of course, for modern computer-generated imagery, determining pixel colors, and thereby generating imagery, can be more complicated, as there are lighting issues, reflections, interpolations, and other considerations.

In various embodiments, a live action capture system 1202 captures a live scene that plays out on a stage 1204. The live action capture system 1202 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 1206(1) and 1206(2) capture the scene, while in some systems, there might be other sensor(s) 1208 that capture information from the live scene (e.g., infrared cameras, infrared sensors, motion capture ("mo-cap") detectors, etc.). On the stage 1204, there might be human actors, animal actors, inanimate objects, background objects, and possibly an object such as a green screen 1210 that is designed to be captured in a live scene recording in such a way that it is easily overlaid with computer-generated imagery. The stage 1204 might also contain objects that serve as fiducials, such as fiducials 1212(1)-(3), that might be used post-capture to determine where an object was during capture. A live action scene might be illuminated by one or more lights, such as an overhead light 1214.

During or following the capture of a live action scene, the live action capture system 1202 might output live action footage to a live action footage storage 1220. A live action processing system 1222 might process live action footage to generate data about that live action footage and store that data into a live action metadata storage 1224. The live action processing system 1222 might include computer processing capabilities, image processing capabilities, one or more processors, program code storage for storing program instructions executable by the one or more processors, as well as user input devices and user output devices, not all of which are shown. The live action processing system 1222 might process live action footage to determine boundaries of objects in a frame or multiple frames, determine locations of objects in a live action scene, where a camera was relative to some action, distances between moving objects and fiducials, etc. Where elements are detected by sensor or other means, the metadata might include location, color, and intensity of the overhead light 1214, as that might be useful in post-processing to match computer-generated lighting on objects that are computer-generated and overlaid on the live action footage. The live action processing system 1222 might operate autonomously, perhaps based on predetermined program instructions, to generate and output the live action metadata upon receiving and inputting the live action footage. The live action footage can be camera-captured data as well as data from other sensors.

An animation creation system 1230 is another part of the visual content generation system 1200. The animation creation system 1230 might include computer processing capabilities, image processing capabilities, one or more processors, program code storage for storing program instructions executable by the one or more processors, as well as user input devices and user output devices, not all of which are shown. The animation creation system 1230 might be used by animation artists, managers, and others to specify details, perhaps programmatically and/or interactively, of imagery to be generated. From user input and data from a database or other data source, indicated as a data store 1232, the animation creation system 1230 might generate and output data representing objects (e.g., a horse, a human, a ball, a teapot, a cloud, a light source, a texture, etc.) to an object storage 1234, generate and output data representing a scene into a scene description storage 1236, and/or generate and output data representing animation sequences to an animation sequence storage 1238.

Scene data might indicate locations of objects and other visual elements, values of their parameters, lighting, camera location, camera view plane, and other details that a rendering engine 1250 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 1230 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 1234 as new or different objects. For example, an operator might read in an object that has dozens of specified parameters (movable joints, color options, textures, etc.), select some values for those parameters and then save a baked object that is a simplified object with now fixed values for those parameters.

Rather than have to specify each detail of a scene, data from the data store 1232 might be used to drive object presentation. For example, if an artist is creating an animation of a spaceship passing over the surface of the Earth, instead of manually drawing or specifying a coastline, the artist might specify that the animation creation system 1230 is to read data from the data store 1232 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 1244 might read in live action metadata, such as data representing movements and positions of body parts of a live actor during a live action scene, and generate corresponding animation parameters to be stored in the animation sequence storage 1238 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 1222. The animation driver generator 1244 might convert that movement data into specifications of how joints of an articulated CGI character are to move over time.

A rendering engine 1250 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important than speed for a movie maker to generate data that will be used for final prints of feature films to be distributed. The rendering engine 1250 might include computer processing capabilities, image processing capabilities, one or more processors, program code storage for storing program instructions executable by the one or more processors, as well as user input devices and user output devices, not all of which are shown.

The visual content generation system 1200 can also include a merging system 1260 (labeled "Live+CGI Merging System") that merges live footage with animated content. The live footage might be obtained and input by reading from the live action footage storage 1220 to obtain live action footage, by reading from the live action metadata storage 1224 to obtain details such as presumed segmentation in captured images segmenting objects in a live action scene from their background (perhaps aided by the fact that the green screen 1210 was part of the live action scene), and by obtaining CGI imagery from the rendering engine 1250.

A merging system 1260 might also read data from rule sets for merging/combining storage 1262. A very simple example of a rule in a rule set might be "obtain a full image including a two-dimensional pixel array from live footage, obtain a full image including a two-dimensional pixel array from the rendering engine 1250, and output an image where each pixel is a corresponding pixel from the rendering engine 1250 when the corresponding pixel in the live footage is a specific color of green, otherwise output a pixel value from the corresponding pixel in the live footage."

The merging system 1260 might include computer processing capabilities, image processing capabilities, one or more processors, program code storage for storing program instructions executable by the one or more processors, as well as user input devices and user output devices, not all of which are shown. The merging system 1260 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 1260, such as modifying boundaries of segmented objects, inserting blurs to smooth out imperfections, or adding other effects. Based on its inputs, the merging system 1260 can output an image to be stored in a static image storage 1270 and/or a sequence of images in the form of video to be stored in an animated/combined video storage 1272.

Thus, as described, the visual content generation system 1200 can be used to generate video that combines live action with computer-generated animation using various components and tools, some of which are described in more detail herein. While the visual content generation system 1200 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 13:
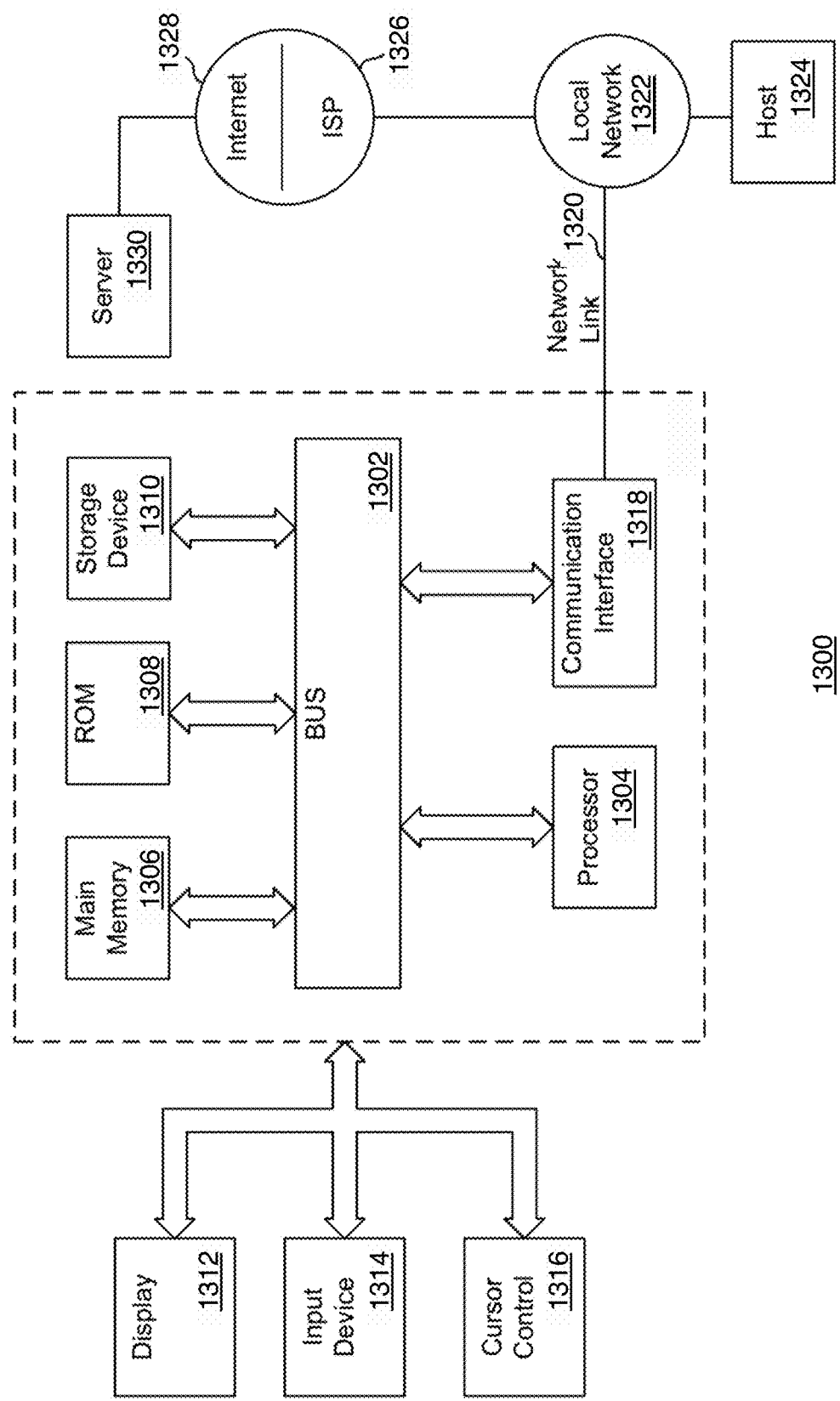
FIG. 13 is a block diagram of an example computer system, which may be used for embodiments described herein.

FIG. 13 is a block diagram of an example computer system 1300, which may be used for embodiments described herein. The computer system 1300 includes a bus 1302 or other communication mechanism for communicating information, and a processor 1304 coupled with the bus 1302 for processing information. In some embodiments, the processor 1304 may be a general purpose microprocessor.

The computer system 1300 also includes a main memory 1306, such as a random access memory (RAM) or other dynamic storage device, coupled to the bus 1302 for storing information and instructions to be executed by the processor 1304. The main memory 1306 may also be used for storing temporary variables or other intermediate information during execution of instructions to be executed by the processor 1304. Such instructions, when stored in non-transitory storage media accessible to the processor 1304, render the computer system 1300 into a special-purpose machine that is customized to perform the operations specified in the instructions. In various embodiments, instructions may include memory-storing instructions, which when executed by the one or more processors cause the computer system to carry out embodiments described herein.

The computer system 1300 further includes a read only memory (ROM) 1308 or other static storage device coupled to the bus 1302 for storing static information and instructions for the processor 1304. A storage device 1310, such as a magnetic disk or optical disk, is provided and coupled to the bus 1302 for storing information and instructions.

The computer system 1300 may be coupled via the bus 1302 to a display 1312, such as a computer monitor, for displaying information to a computer user. An input device 1314, including alphanumeric and other keys, is coupled to the bus 1302 for communicating information and command selections to the processor 1304. Another type of user input device is a cursor control 1316, such as a mouse, a trackball, or cursor direction keys for communicating direction information and command selections to the processor 1304 and for controlling cursor movement on the display 1312. This input device 1314 typically has two degrees of freedom in two axes, a first axis (e.g., x) and a second axis (e.g., y), that allows the input device 1314 to specify positions in a plane.

The computer system 1300 may implement the techniques described herein using customized hard-wired logic, one or more ASICs or FPGAs, firmware, and/or program logic, which, in combination with the computer system, causes or programs the computer system 1300 to be a special-purpose machine. According to one embodiment, the techniques herein are performed by the computer system 1300 in response to the processor 1304 executing one or more sequences of one or more instructions contained in the main memory 1306. Such instructions may be read into the main memory 1306 from another storage medium, such as the storage device 1310. Execution of the sequences of instructions contained in the main memory 1306 causes the processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as the storage device 1310. Volatile media includes dynamic memory, such as the main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 1302. Transmission media can also take the form of acoustic or light waves, such as those generated during radio wave and infrared data communications.

Various forms of media may be involved in carrying one or more sequences of one or more instructions to the processor 1304 for execution. For example, the instructions may initially be carried on a magnetic disk or solid-state drive of a remote computer. The remote computer can load the instructions into its dynamic memory and send the instructions over a network connection. A modem or network interface local to the computer system 1300 can receive the data. The bus 1302 carries the data to the main memory 1306, from which the processor 1304 retrieves and executes the instructions. The instructions received by the main memory 1306 may optionally be stored on the storage device 1310 either before or after execution by the processor 1304.

The computer system 1300 also includes a communication interface 1318 coupled to the bus 1302. The communication interface 1318 provides a two-way data communication coupling to a network link 1320 that is connected to a local network 1322. For example, the communication interface 1318 may be an integrated services digital network ("ISDN") card, cable modem, satellite modem, or a modem to provide a data communication connection to a corresponding type of telephone line. Wireless links may also be implemented. In any such implementation, the communication interface 1318 sends and receives electrical, electromagnetic, or optical signals that carry digital data streams representing various types of information.

The network link 1320 typically provides data communication through one or more networks to other data devices. For example, the network link 1320 may provide a connection through a local network 1322 to a host computer 1324 or to data equipment operated by an Internet Service Provider ("ISP") 1326. The ISP 1326 in turn provides data communication services through the world wide packet data communication network now commonly referred to as the "Internet" 1328. The local network 1322 and the Internet 1328 both use electrical, electromagnetic, or optical signals that carry digital data streams. The signals through the various networks and the signals on the network link 1320 and through the communication interface 1318, which carry the digital data to and from the computer system 1300, are example forms of transmission media.

The computer system 1300 can send messages and receive data, including program code, through the network(s), the network link 1320, and the communication interface 1318. In the Internet example, a server 1330 might transmit a requested code for an application program through the Internet 1328, the ISP 1326, the local network 1322, and the communication interface 1318. The received code may be executed by the processor 1304 as it is received, and/or stored in the storage device 1310, or other non-volatile storage for later execution.

Operations of processes described herein can be performed in any suitable order unless otherwise indicated herein or otherwise clearly contradicted by context. Processes described herein may be performed under the control of one or more computer systems (e.g., the computer system 1300) configured with executable instructions and may be implemented as code (e.g., executable instructions, one or more computer programs, or one or more applications) executing collectively on one or more processors, by hardware, or combinations thereof. The code may be stored on a machine-readable or computer-readable storage medium, for example, in the form of a computer program including a plurality of machine-readable code or instructions executable by one or more processors of a computer or machine to carry out embodiments described herein. The computer-readable storage medium may be non-transitory. The code may also be carried by any computer-readable carrier medium, such as a transient medium or signal, e.g., a signal transmitted over a communications network.

Although the description has been described with respect to particular embodiments thereof, these particular embodiments are merely illustrative, and not restrictive. Controls can be provided to allow modifying various parameters of the compositing at the time of performing the recordings. For example, the resolution, number of frames, accuracy of depth position may all be subject to human operator changes or selection.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Some embodiments may be implemented as a system that includes one or more processors and logic encoded in one or more non-transitory computer-readable storage media for execution by the one or more processors. The logic when executed is operable to cause the one or more processors to perform embodiments described herein.

Some embodiments may be implemented as a system that includes one or more processors and a non-transitory storage medium storing processor-readable instructions. The processor-readable instructions when executed by the one or more processors of the system cause the system to carry out embodiments described herein.

Some embodiments may be implemented as a non-transitory computer-readable storage medium storing computer-readable code. The computer-readable code when executed by one or more processors of a computer cause the computer to carry out embodiments described herein.

Some embodiments may be implemented as a non-transitory computer-readable storage medium with program instructions stored thereon. The program instructions when executed by one or more processors are operable to cause the one or more processors to perform embodiments described herein.

Some embodiments may be implemented as a non-transitory computer-readable storage medium for use by or in connection with a instruction execution system, apparatus, system, or device. Particular embodiments can be implemented in the form of control logic in software or hardware or a combination of both. The control logic, when executed by one or more processors, may be operable to perform that which is described in particular embodiments.

Some embodiments may be implemented as a non-transitory processor-readable storage medium including instructions executable by one or more digital processors. The instructions when executed by the one or more digital processors perform embodiments described herein.

Some embodiments may be implemented as a carrier medium carrying computer-readable code. The computer-readable code when executed by one or more processors of a computer causes the computer to carry out embodiments described herein.

Some embodiments may be implemented as processor-implementable code provided on a computer-readable medium. The computer-readable medium may include a non-transient storage medium, such as solid-state memory, a magnetic disk, optical disk, etc., or a transient medium such as a signal transmitted over a computer network. The processor-implementable code when executed by one or more processors of a computer causes the computer to carry out embodiments described herein.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method for calibrating cameras in a live action scene, the method comprising:
    configuring a plurality of reference cameras to observe at least one portion of the live action scene;
    configuring one or more moving cameras having unconstrained motion to observe one or more moving objects in the live action scene and to observe at least three known reference points associated with the plurality of reference cameras, wherein the at least three known reference points are attached to different respective reference cameras of the plurality of reference cameras, and wherein the at least three known reference points are in fixed locations in the live action scene;
    receiving reference point data in association with the one or more moving cameras, wherein the reference point data is based on the at least three known reference points in their respective fixed locations; and
    computing a location and an orientation of the one or more moving cameras based on the reference point data and the fixed locations of the known reference points attached to their respective reference cameras.

2. The method of claim 1, wherein at least one reference camera of the plurality of reference cameras is at a known location relative to at least a second reference camera of the plurality of reference cameras.

3. The method of claim 1, wherein the plurality of reference cameras is mounted on one or more rigid structures.

4. The method of claim 1, wherein at least one moving camera is mounted on a mobile apparatus.

5. The method of claim 1, further comprising computing the location of the one or more moving cameras based at least in part on one or more of global positioning system data, position sensor data, and inertial guide sensor data.

6. The method of claim 1, wherein at least one moving object of the one or more moving objects is a person.

7. The method of claim 1, wherein at least a portion of the one or more known reference points are coupled to one or more reference cameras of the plurality of reference cameras.

8. A system for calibrating cameras in a live action scene, the system comprising:
    one or more processors; and
    logic encoded in one or more non-transitory computer-readable storage media for execution by the one or more processors and when executed operable to cause the one or more processors to perform operations comprising:
    configuring a plurality of reference cameras to observe at least one portion of the live action scene;
    configuring one or more moving cameras having unconstrained motion to observe one or more moving objects in the live action scene and to observe at least three known reference points associated with the plurality of reference cameras, wherein the at least three known reference points are attached to different respective reference cameras of the plurality of reference cameras, and wherein the at least three known reference points are in fixed locations in the live action scene;
    receiving reference point data in association with the one or more moving cameras, wherein the reference point data is based on the at least three known reference points in their respective fixed locations; and
    computing a location and an orientation of the one or more moving cameras based on the reference point data and the fixed locations of the known reference points attached to their respective reference cameras.

9. The system of claim 8, wherein at least one reference camera of the plurality of reference cameras is at a known location relative to at least a second reference camera of the plurality of reference cameras.

10. The system of claim 8, wherein the plurality of reference cameras is mounted on one or more rigid structures.

11. The system of claim 8, wherein at least one moving camera is mounted on a mobile apparatus.

12. The system of claim 8, wherein the logic when executed is further operable to cause the one or more processors to perform operations comprising computing the location of the one or more moving cameras based at least in part on one or more of global positioning system data, position sensor data, and inertial guide sensor data.

13. The system of claim 8, wherein at least one moving object of the one or more moving objects is a person.

14. The system of claim 8, wherein at least a portion of the one or more known reference points are coupled to one or more reference cameras of the plurality of reference cameras.

15. A non-transitory computer-readable storage medium with program instructions stored thereon, the program instructions when executed by one or more processors are operable to cause the one or more processors to perform operations comprising:
    configuring a plurality of reference cameras to observe at least one portion of the live action scene;
    configuring one or more moving cameras having unconstrained motion to observe one or more moving objects in the live action scene and to observe at least three known reference points associated with the plurality of reference cameras, wherein the at least three known reference points are attached to different respective reference cameras of the plurality of reference cameras, and wherein the at least three known reference points are in fixed locations in the live action scene;
    receiving reference point data in association with the one or more moving cameras, wherein the reference point data is based on the at least three known reference points in their respective fixed locations; and
    computing a location and an orientation of the one or more moving cameras based on the reference point data and the fixed locations of the known reference points attached to their respective reference cameras.

16. The computer-readable storage medium of claim 15, wherein at least one reference camera of the plurality of reference cameras is at a known location relative to at least a second reference camera of the plurality of reference cameras.

17. The computer-readable storage medium of claim 15, wherein the plurality of reference cameras is mounted on one or more rigid structures.

18. The computer-readable storage medium of claim 15, wherein at least one moving camera is mounted on a mobile apparatus.

19. The computer-readable storage medium of claim 15, wherein the instructions when executed are further operable to cause the one or more processors to perform operations comprising computing the location of the one or more moving cameras based at least in part on one or more of global positioning system data, position sensor data, and inertial guide sensor data.

20. The computer-readable storage medium of claim 15, wherein at least one moving object of the one or more moving objects is a person.

* * * * *